US010473354B2

(12) United States Patent
Hatomura et al.

(10) Patent No.: US 10,473,354 B2
(45) Date of Patent: Nov. 12, 2019

(54) AIR-CONDITIONING APPARATUS

(71) Applicant: Mitsubishi Electric Corporation, Tokyo (JP)

(72) Inventors: Takeshi Hatomura, Tokyo (JP); Osamu Morimoto, Tokyo (JP); Katsuhiro Ishimura, Tokyo (JP); Shinichi Wakamoto, Tokyo (JP); Soshi Ikeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 24 days.

(21) Appl. No.: 15/518,785

(22) PCT Filed: Dec. 5, 2014

(86) PCT No.: PCT/JP2014/082313
§ 371 (c)(1),
(2) Date: Apr. 13, 2017

(87) PCT Pub. No.: WO2016/088268
PCT Pub. Date: Jun. 9, 2016

(65) Prior Publication Data
US 2017/0234582 A1    Aug. 17, 2017

(51) Int. Cl.
*F24F 11/89*    (2018.01)
*F25B 13/00*    (2006.01)
*F25B 41/06*    (2006.01)

(52) U.S. Cl.
CPC .............. *F24F 11/89* (2018.01); *F25B 13/00* (2013.01); *F25B 41/062* (2013.01);
(Continued)

(58) Field of Classification Search
CPC .. B60H 1/00; B60H 1/00485; B60H 1/00978; B60H 1/32; B60H 1/3217; B60H 1/3223;
(Continued)

(56) References Cited

U.S. PATENT DOCUMENTS 9,726,409 B2 *    8/2017    Yamashita ............... F25B 9/006
10,168,079 B2 *   1/2019    Takeuchi .................. F25B 6/04
(Continued)

FOREIGN PATENT DOCUMENTS

EP    2434233 A2 *    3/2012    ............ F25B 29/003
EP    3021059 A1 *    5/2016    ............. F25B 13/00
(Continued)

OTHER PUBLICATIONS

Tom Bensen, Equation of State (Ideal Gas), Aug. 16, 1999, NASA (Year: 1999).*

(Continued)

*Primary Examiner* — Edward F Landrum
*Assistant Examiner* — Chang H. Park
(74) *Attorney, Agent, or Firm* — Posz Law Group, PLC

(57) ABSTRACT

An air-conditioning apparatus includes a refrigeration cycle circulating refrigerant and connecting a compressor, a heat-source-side heat exchanger, one or more of load-side expansion devices, and one or more of load-side heat exchangers by refrigerant pipes, a bypass having one end connected to a discharge side of the compressor of the refrigeration cycle and the other end connected to a suction side of the compressor of the refrigeration cycle to bypass a portion of the refrigerant discharged from the compressor, a first expansion device depressurizing the refrigerant flowing through the bypass, an auxiliary heat exchanger cooling the refrigerant depressurized at the first expansion device, a second expansion device controlling a flow rate of the refrigerant flowing from the auxiliary heat exchanger to the suction side of the compressor, and a controller controlling an opening degree of the second expansion device.

10 Claims, 14 Drawing Sheets

(52) U.S. Cl.
CPC ...... *F25B 41/067* (2013.01); *F25B 2313/006* (2013.01); *F25B 2313/021* (2013.01); *F25B 2313/0233* (2013.01); *F25B 2313/0272* (2013.01); *F25B 2313/02741* (2013.01); *F25B 2313/0313* (2013.01); *F25B 2313/0314* (2013.01); *F25B 2313/0315* (2013.01); *F25B 2341/0661* (2013.01); *F25B 2400/0403* (2013.01); *F25B 2400/0409* (2013.01); *F25B 2600/2501* (2013.01); *F25B 2600/2513* (2013.01); *F25B 2700/1933* (2013.01); *F25B 2700/2106* (2013.01); *F25B 2700/21152* (2013.01)

(58) Field of Classification Search
CPC .......... B60H 1/3225; B60H 2001/3266; F04B 49/03; F04D 27/02; F04D 27/0292; F16K 11/0785; F16K 15/025; F16K 15/03; F16K 15/12; F16K 17/04; F16K 17/0413; F16K 17/06; F16K 3/182; F16K 3/202; F16K 31/047; F16K 31/10; F16K 31/265; F16K 31/50; F25B 49/00; F25B 49/005
See application file for complete search history.

(56) References Cited

U.S. PATENT DOCUMENTS

2010/0205987 A1* 8/2010 Okazaki ................. F25B 9/008
62/190

2014/0090409 A1 4/2014 Yamashita et al.
2014/0096551 A1* 4/2014 Morimoto ............... F25B 9/006
62/129
2015/0096321 A1 4/2015 Kawano et al.

FOREIGN PATENT DOCUMENTS

| JP | 06241623 | A | * | 9/1994 | |
| --- | --- | --- | --- | --- | --- |
| JP | H06-241623 | A | | 9/1994 | |
| JP | 07280378 | A | * | 10/1995 | |
| JP | H07-280378 | A | | 10/1995 | |
| JP | 2008-138921 | A | | 6/2008 | |
| JP | 2012-067967 | A | | 4/2012 | |
| JP | 2012067967 | A | * | 4/2012 | ............ F25B 29/003 |
| JP | 5500240 | B2 | | 3/2014 | |
| JP | 5677570 | B2 | * | 2/2015 | .............. F25B 9/006 |
| WO | 2012/172597 | A1 | | 12/2012 | |
| WO | WO-2013136693 | A1 | * | 9/2013 | ................ F25B 6/04 |
| WO | WO 2015004747 | A1 | * | 1/2015 | .............. F24F 11/89 |

OTHER PUBLICATIONS

Office Action dated Sep. 5, 2017 issued in corresponding JP patent application No. 2016-562184 (and English translation).
International Search Report of the International Searching Authority dated Mar. 10, 2015 for the corresponding International application No. PCT/JP2014/082313 (and English translation).

* cited by examiner

AIR-CONDITIONING APPARATUS

CROSS REFERENCE TO RELATED APPLICATION

This application is a U.S. national stage application of PCT/JP2014/082313 filed on Dec. 5, 2014, the contents of which are incorporated herein by reference.

TECHNICAL FIELD

The present invention relates to an air-conditioning apparatus applicable to a multi-air-conditioning system for a building, for example.

BACKGROUND ART

An air-conditioning apparatus applicable to, for example, a multi-air-conditioning system for a building, is provided with a refrigerant circuit including an outdoor unit, which is a heat source unit disposed outside the building, and an indoor unit disposed inside the building that are connected with pipes. The air-conditioning apparatus circulates refrigerant through the refrigerant circuit to heat or cool air through radiation or reception of heat by the refrigerant, thereby heating or cooling the space to be air-conditioned.

Patent Literature 1 discloses an air-conditioning apparatus provided with an injection circuit including the injection ports of a bypass expansion device, a refrigerant heat exchanger, an on-off valve, and a compressor that are sequentially connected via an injection pipe branching from a fluid pipe connecting the refrigerant heat exchanger and the load-side expansion device. The air-conditioning apparatus injects the refrigerant under intermediate pressure during compression by the compressor, to increase the flow rate of the refrigerant. This configuration can maintain the heating capacity without an abnormal increase in the discharge temperature even at a low outdoor temperature.

Patent Literature 2 discloses a refrigerator including an intermediate injection flow channel that combines a portion of refrigerant flowing from a condenser to an evaporator with intermediate-pressure refrigerant in a compressor, and a suction injection flow channel that combines another portion of the refrigerant flowing from the condenser to the evaporator with low-pressure refrigerant sucked into the compressor. When the intermediate injection flow channel causes a reduction in operational efficiency in this refrigerator, the suction injection flow channel can reduce the discharge temperature of the compressor.

CITATION LIST

Patent Literature

Patent Literature 1: Japanese Unexamined Patent Application Publication No. 2008-138921
Patent Literature 2: Japanese Patent Publication No. 5500240

SUMMARY OF INVENTION

Technical Problem

In the air-conditioning apparatus of Patent Literature 1, when the saturation temperature of high-pressure refrigerant reaches or exceeds the temperature of the indoor or outdoor air after start-up of the air-conditioning apparatus, the refrigerant is liquefied through heat transfer from the high-pressure gaseous refrigerant to the outdoor or indoor air. The resulting low-quality (high in liquid phase) refrigerant in a two-phase gas-liquid state can be injected into the intermediate-pressure portion of the compressor, to reduce the discharge temperature of the compressor. However, the discharge temperature can be controlled only in compressors that suck the refrigerant into intermediate-temperature portions and thus this configuration cannot be used commonly. Moreover, the compressors that suck the refrigerant into intermediate-pressure portions are expensive compared to compressors without such a configuration.

The air-conditioning apparatus of Patent Literature 1 has a circuit configuration that can inject the refrigerant during a cooling operation. In detail, the air-conditioning apparatus of Patent Literature 1 includes a bypass expansion device that controls the flow rate of the refrigerant injected to an intermediate-pressure chamber in the compressor and a refrigerant heat exchanger that cools the refrigerant flowing from the bypass expansion device. The bypass expansion device controls the flow rate of the refrigerant flowing into the refrigerant heat exchanger, to control the temperature of the refrigerant discharged from the compressor. Thus, the discharge temperature and the degree of subcooling at the outlet of the condenser cannot be individually controlled to reach different target temperatures. This configuration precludes compatibility between an appropriate degree of subcooling and appropriate control of the discharge temperature.

When the outdoor unit is connected to the indoor unit with a long extension pipe, the control of the discharge temperature to a target temperature precludes the control of the degree of subcooling at the outlet of the outdoor unit to a target value. The pressure loss at the extension pipe may cause the refrigerant flowing into the indoor unit to be brought into a two-phase gas-liquid state. For example, in a multi-air-conditioning apparatus including multiple indoor units provided with expansion devices, refrigerant in a two-phase gas-liquid state flowing into the inlet of the expansion device generates noise and causes unstable control. Such drawbacks decrease the reliability of the air-conditioning system.

The refrigerator of Patent Literature 2 reduces the discharge temperature by injecting saturated gaseous refrigerant from a high-pressure receiver into an intermediate-pressure chamber or a suction pipe of the compressor. However, such a reduction of the discharge temperature by the saturated gaseous refrigerant has a small cooling effect compared to that by two-phase refrigerant. Thus, a large volume of refrigerant should be transferred into the intermediate-pressure chamber or the suction pipe of the compressor. This configuration causes an excess volume of the refrigerant to bypass the indoor unit during cooling, thereby decreasing the cooling ability. During an operation under significantly low and high pressures and a high discharge temperature of the compressor, such as a heating operation under a low outdoor temperature, an increase in the injection flow rate cannot readily achieve a high refrigeration effect for sufficiently decreasing the discharge temperature.

An object of the present invention, which has been conceived to overcome at least one of the drawbacks described above, is to provide an air-conditioning apparatus that is highly reliable without a compressor having a special structure.

Solution to Problem

An air-conditioning apparatus of one embodiment of the present invention includes a refrigeration cycle circulating refrigerant and connecting a compressor, a heat-source-side heat exchanger, one or more of load-side expansion devices, and one or more of load-side heat exchangers by refrigerant pipes, a bypass having one end connected to a discharge side of the compressor of the refrigeration cycle and the other end connected to a suction side of the compressor of the refrigeration cycle to bypass a portion of the refrigerant discharged from the compressor, a first expansion device disposed in the bypass and depressurizing the refrigerant flowing through the bypass, an auxiliary heat exchanger disposed downstream of the first expansion device of the bypass and cooling the refrigerant depressurized at the first expansion device, a second expansion device disposed downstream of the auxiliary heat exchanger of the bypass and controlling a flow rate of the refrigerant flowing from the auxiliary heat exchanger to the suction side of the compressor, and a controller controlling an opening degree of the second expansion device.

Advantageous Effects of Invention

According to the one embodiment of the present invention, a reliable air-conditioning apparatus without a compressor having a special structure can be provided.

DESCRIPTION OF EMBODIMENTS

Embodiment 1

Figure 1:
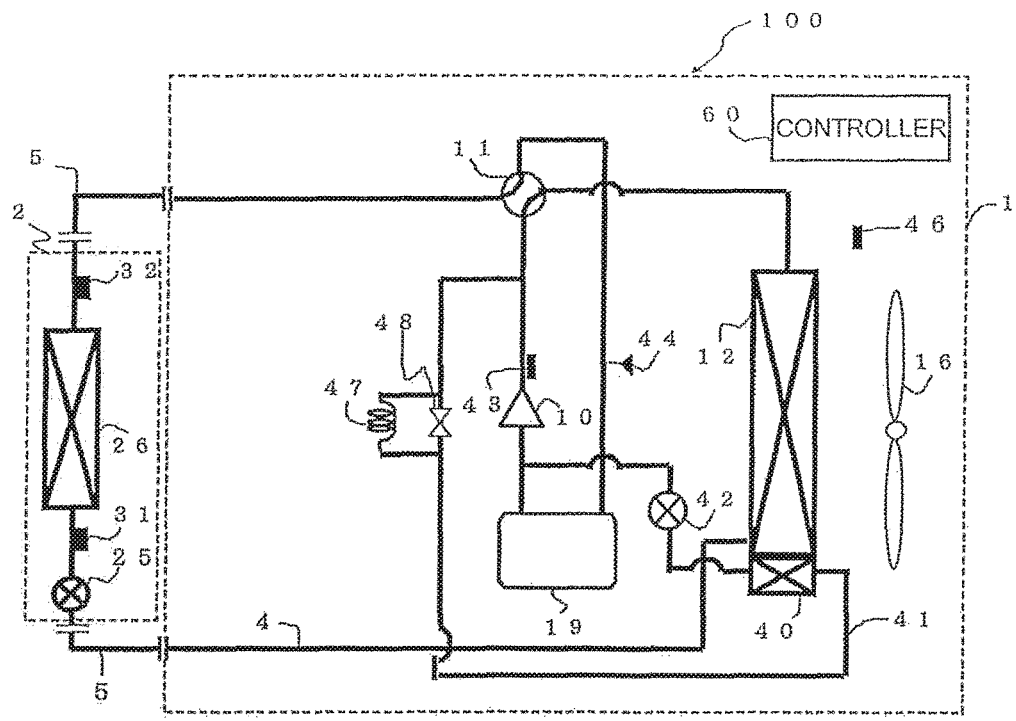
FIG. 1 is a schematic circuit diagram illustrating an example configuration of the circuit of an air-conditioning apparatus 100 according to Embodiment 1 of the present invention.

An air-conditioning apparatus according to Embodiment 1 of the present invention will be described below. FIG. 1 is a schematic circuit diagram illustrating an example configuration of the circuit of the air-conditioning apparatus 100 of this embodiment. With reference to FIG. 1, the air-conditioning apparatus 100 includes an outdoor unit 1 and an indoor unit 2, mutually connected via multiple (two in this embodiment) main pipes 5. FIG. 1 illustrates a single indoor unit 2. Alternatively, two or more indoor units 2 may be provided.

The air-conditioning apparatus 100 further includes a refrigerant circuit including a refrigeration cycle and a bypass. The refrigeration cycle includes, for example, an accumulator 19, a compressor 10, a refrigerant flow-channel switcher 11, a heat-source-side heat exchanger 12, a load-side expansion device 25, and a load-side heat exchanger 26, all of which are circularly connected in this order via refrigerant pipes 4. The bypass connects the discharge side of the compressor 10 (upstream of the refrigerant flow-channel switcher 11) and the suction side of the compressor 10 (downstream of the accumulator 19) of the refrigeration cycle via a bypass pipe 41. The bypass includes a first expansion device 47, a third expansion device 48, an auxiliary heat exchanger 40, and a second expansion device 42, for example. The auxiliary heat exchanger 40 is disposed downstream of the first expansion device 47 and the third expansion device 48. The second expansion device 42 is disposed downstream of the auxiliary heat exchanger 40.

[Outdoor Unit 1]

The outdoor unit 1 includes the compressor 10, the refrigerant flow-channel switcher 11, the heat-source-side heat exchanger 12, the accumulator 19, the auxiliary heat exchanger 40, the first expansion device 47, the second expansion device 42, the third expansion device 48, and the bypass pipe 41. The outdoor unit 1 further includes a heat-source-side fan 16 that sends air to the heat-source-side heat exchanger 12 and the auxiliary heat exchanger 40.

The compressor 10 sucks and compresses the refrigerant into a high-temperature high-pressure state. The compressor 10 is an inverter compressor having a controllable capacity, for example. The compressor 10 has a low-pressure shell structure, for example. A compressor having a low-pressure shell structure includes a compression chamber inside a sealed container accommodating a low-pressure refrigerant atmosphere. The compressor sucks and compresses the low-pressure refrigerant in the sealed container.

The refrigerant flow-channel switcher 11 switches the refrigerant flow channel for a heating operation mode and the refrigerant flow channel for a cooling operation mode. The refrigerant flow-channel switcher 11 includes a four-way valve, for example. The heat-source-side heat exchanger 12 acts as a condenser or a gas cooler in a cooling operation mode or acts as an evaporator in a heating operation mode.

The heat-source-side heat exchanger 12 acts as an evaporator in a heating operation mode or a condenser or a gas cooler (a condenser in this embodiment) in a cooling operation mode. The heat-source-side heat exchanger 12 exchanges heat between the air supplied by the heat-source-side fan 16 and the refrigerant. The accumulator 19 is disposed in the suction portion of the compressor 10 and accumulates excess refrigerant due to difference in required volume of refrigerant between heating and cooling operation modes or a variation during the transitional operation.

The auxiliary heat exchanger 40 acts as a condenser or a gas cooler (a condenser in this embodiment) in both heating and cooling operation modes. The auxiliary heat exchanger 40 exchanges heat between the air supplied by the heat-source-side fan 16 and the refrigerant. The heat-source-side heat exchanger 12 and the auxiliary heat exchanger 40 have a structure in which heat transfer tubes in different refrigerant flow channels are connected to common heat transfer fins. In detail, multiple heat transfer fins are adjacently disposed facing in the same direction. The heat transfer tubes are inserted into the heat transfer fins. The heat-source-side heat exchanger 12 and the auxiliary heat exchanger 40 are integrated with the same heat transfer fins. The heat transfer tubes of the heat-source-side heat exchanger 12 and the heat transfer tubes of the auxiliary heat exchanger 40 each define an independent refrigerant flow channel. The heat-source-side heat exchanger 12 is disposed in the upper portion and the auxiliary heat exchanger 40 is disposed below the heat-source-side heat exchanger 12, for example. The adjacent heat transfer fins are shared by the heat-source-side heat exchanger 12 and auxiliary heat exchanger 40. The heat-source-side heat exchanger 12 and the auxiliary heat exchanger 40 are arranged in series parallel in a direction of the flow of air sent from the heat-source-side fan 16, for example. Thus, the air surrounding the heat-source-side heat exchanger 12 flows to both the heat-source-side heat exchanger 12 and the auxiliary heat exchanger 40. The auxiliary heat exchanger 40 is disposed to have a heat transfer area smaller than that of the heat-source-side heat exchanger 12.

The first expansion device 47 is a fixed expansion device including a pipe having diameter smaller than those of the upstream and downstream refrigerant pipes connected to the first expansion device 47, for example. The first expansion device 47 is a capillary tube, for example. The first expansion device 47 is disposed between the discharge pipe of the compressor 10 and the inlet flow channel of the auxiliary heat exchanger 40 along the flow of the refrigerant. The first expansion device 47 depressurizes a portion of the gaseous refrigerant discharged from the compressor 10 and feeds it to the inlet flow channel of the auxiliary heat exchanger 40.

The bypass pipe 41 constitutes the bypass and connects at least the first expansion device 47 and the auxiliary heat exchanger 40. A portion of the refrigerant discharged from the compressor 10 and depressurized at the first expansion device 47 flows into the bypass pipe 41. The bypass pipe 41 guides the high- or intermediate-pressure gaseous refrigerant to the auxiliary heat exchanger 40 and the liquid refrigerant condensed at the auxiliary heat exchanger 40 to the suction portion of the compressor 10 via the second expansion device 42. The intermediate pressure is lower than the high pressure (the refrigerant pressure in the condenser or the discharge pressure at the compressor 10, for example) in the refrigeration cycle and is higher than the low pressure (the refrigeration pressure in the evaporator or the suction pressure of the compressor 10, for example) in the refrigeration cycle. One end of the bypass pipe 41 is connected to the refrigerant pipe 4 connecting the compressor 10 and the refrigerant flow-channel switcher 11. The other end of the bypass pipe 41 is connected to the refrigerant pipe 4 connecting the compressor 10 and the accumulator 19.

The second expansion device 42 has a variable opening degree that can be controlled continuously or stepwise by the controller described below, for example. The second expansion device 42 is an electronic expansion valve, for example. The second expansion device 42 is disposed on the bypass pipe 41 at the outlet side of the auxiliary heat exchanger 40. The second expansion device 42 controls the flow rate of the liquid refrigerant condensed at the auxiliary heat exchanger 40 and flowing in the suction portion of the compressor 10.

The third expansion device 48 is disposed in series with the first expansion device 47 between the discharge pipe of the compressor 10 and the inlet flow channel of the auxiliary heat exchanger 40, along the flow of the refrigerant. At a high flow rate of the refrigerant discharged from the compressor 10, the third expansion device 48 depressurizes a portion of the gaseous refrigerant discharged from the compressor 10 and feeds it to the inlet flow channel of the auxiliary heat exchanger 40. The third expansion device 48 is preferred to include a valve, such as a two-way valve, a solenoid valve, and an electronic expansion valve, which can switch the opening degree of the refrigerant flow channel between at least two positions corresponding to open and closed states.

The outdoor unit 1 includes a discharge temperature sensor 43 that measures the temperature of the high-temperature high-pressure refrigerant discharged from the compressor 10 and outputs a measurement signal. The air suction portion of the heat-source-side heat exchanger 12 of the outdoor unit 1 is provided with an outdoor temperature sensor 46 that measures the ambient temperature of the outdoor unit 1 (for example, the outdoor temperature) and outputs a measurement signal. The outdoor unit 1 includes a pressure sensor 44 that measures the pressure of the refrigerant between the refrigerant flow-channel switcher 11 and the accumulator 19 (suction pressure) and outputs a measurement signal.

[Indoor Unit 2]

The indoor unit 2 is provided with the load-side heat exchanger 26 and the load-side expansion device 25. The load-side heat exchanger 26 is connected to the outdoor unit 1 via multiple main pipes 5. The load-side heat exchanger 26 heats or cools air for heating or cooling to be fed to an indoor space through heat exchange between the air and the refrigerant. The load-side heat exchanger 26 receives indoor air sent from a load-side fan (not shown). The load-side expansion device 25 has a variable opening degree that can be controlled continuously or stepwise, for example. The load-side expansion device 25 is an electronic expansion valve, for example. The load-side expansion device 25 acts as a pressure reducing valve and an expansion valve, and depressurizes and expands the refrigerant. The load-side expansion device 25 is disposed upstream of the load-side heat exchanger 26 along the flow of the refrigerant in a cooling operation mode (for example, the cooling only operation mode).

The indoor unit 2 includes an inlet temperature sensor 31 and an outlet temperature sensor 32, which are thermistors, for example. The inlet temperature sensor 31 measures the temperature of the refrigerant flowing into the load-side heat exchanger 26 and outputs a measurement signal. The inlet temperature sensor 31 is disposed on the refrigerant inlet pipe of the load-side heat exchanger 26. The outlet temperature sensor 32 measures the temperature of the refrigerant flowing out of the load-side heat exchanger 26 and outputs a measurement signal. The outlet temperature sensor 32 is disposed on the refrigerant outlet pipe of the load-side heat exchanger 26.

The air-conditioning apparatus 100 includes a controller 60. The controller 60 includes a microcomputer including a CPU, a ROM, a RAM, and an input-output port. The controller 60 comprehensively controls the operation of the air-conditioning apparatus 100 on the basis of measurement signals from the sensors and instructions from a remote controller. For example, the controller 60 controls the driving frequency of the compressor 10, the rotation frequencies of the heat-source-side fan 16 and the load-side fan (including turning on and off of the fans), switching of the flow channel of the refrigerant flow-channel switcher 11, the opening degree of the second expansion device 42, the opening degree or the open-closed state of the third expansion device 48, and the opening degree of the load-side expansion device 25, to execute the various operation modes described below. The controller 60 according to this embodiment is installed in the outdoor unit 1. Alternatively, the controller 60 may be installed in the indoor unit 2 or may be installed in each unit (one in the outdoor unit 1 and the other in the indoor unit 2, for example).

The operation modes executed by the air-conditioning apparatus 100 will be described below. The controller 60 of the air-conditioning apparatus 100 executes a cooling operation mode by the indoor unit 2 or a heating operation mode by the indoor unit 2, on the basis of an instruction from the indoor unit 2. The operation modes executed by the air-conditioning apparatus 100 illustrated in FIG. 1 has a cooling only operation mode corresponding to cooling operations by all the operating indoor units 2 (hereinafter, may also be simply referred to as "cooling operation mode") and a heating only operation mode corresponding to heating operations by all the operating indoor units 2 (hereinafter, may also be simply referred to as "heating operation mode"). The operation modes will be described below along with the flow of refrigerant.

[Cooling Only Operation Mode (Other than Injection)]

Figure 2:
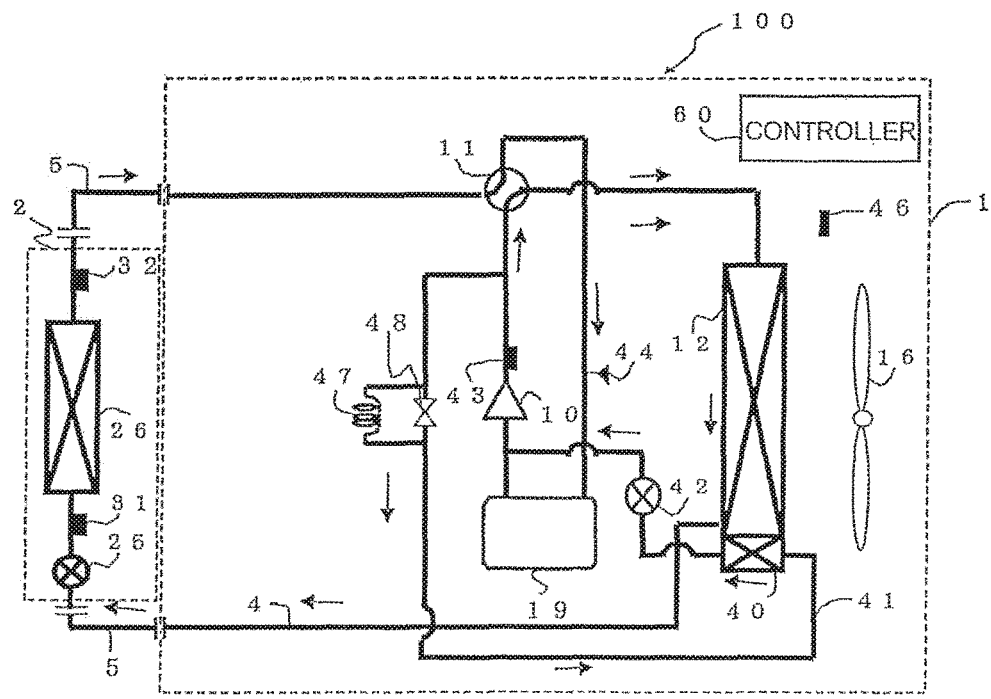
FIG. 2 is a refrigerant circuit diagram illustrating the flow of refrigerant through the air-conditioning apparatus 100 according to Embodiment 1 of the present invention in a cooling only operation mode.

FIG. 2 is a refrigerant circuit diagram illustrating the flow of refrigerant in the air-conditioning apparatus 100 in the cooling only operation mode. FIG. 2 illustrates the flow of refrigerant other than the flow of the injected refrigerant in the cooling only operation mode during generation of cooling load in the load-side heat exchanger 26. In FIG. 2, solid arrows indicate the directions of flowing refrigerant.

With reference to FIG. 2, the low-temperature low-pressure refrigerant is compressed at the compressor 10 into high-temperature high-pressure gaseous refrigerant and is discharged from the compressor 10. The high-temperature high-pressure gaseous refrigerant discharged from the compressor 10 flows into the heat-source-side heat exchanger 12 via the refrigerant flow-channel switcher 11. The gaseous refrigerant flowing in the heat-source-side heat exchanger 12 transfers heat to the outdoor air sent from the heat-source-side fan 16 and is condensed into high-pressure liquid refrigerant. The high-pressure liquid refrigerant flowing out of the heat-source-side heat exchanger 12 flows out of the outdoor unit 1 to flow into the indoor unit 2 via the main pipe 5.

In the indoor unit 2, the high-pressure refrigerant expands at the load-side expansion device 25 into low-temperature low-pressure refrigerant in a two-phase gas-liquid state. The refrigerant in a two-phase gas-liquid state flows into the load-side heat exchanger 26 acting as an evaporator. The refrigerant in a two-phase gas-liquid state flowing in the load-side heat exchanger 26 receives heat from the indoor air and turns into low-temperature low-pressure gaseous refrigerant while cooling the indoor air. At this time, the opening degree of the load-side expansion device 25 is controlled by the controller 60 to achieve a constant degree of superheating. The degree of superheating is determined by the difference between the temperature measured by the inlet temperature sensor 31 and the temperature measured by the outlet temperature sensor 32. The gaseous refrigerant flowing out of the load-side heat exchanger 26 returns to the outdoor unit 1 via the main pipe 5. The refrigerant returning to the outdoor unit 1 flows through the refrigerant flow-channel switcher 11 and the accumulator 19 and returns to the compressor 10.

[Heating Only Operation Mode (Other than Injection)]

Figure 3:
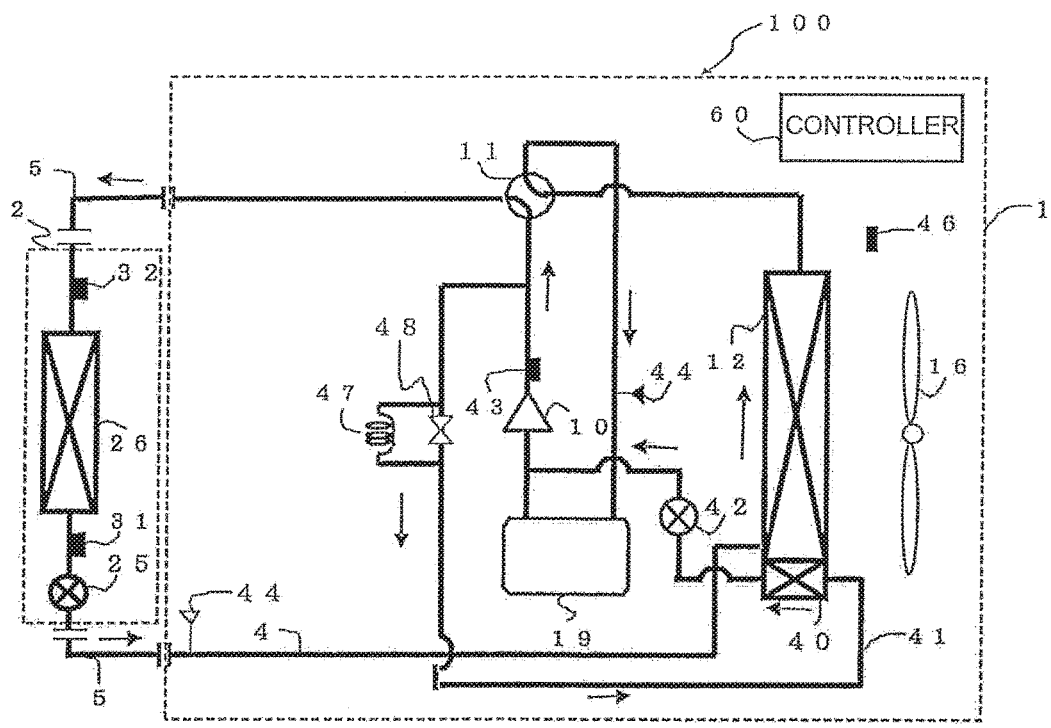
FIG. 3 is a refrigerant circuit diagram illustrating the flow the refrigerant through the air-conditioning apparatus 100 according to Embodiment 1 of the present invention in a heating only operation mode.

FIG. 3 is a refrigerant circuit diagram illustrating the flow of the refrigerant in the air-conditioning apparatus 100 in the heating only operation mode. FIG. 3 illustrates the flow of the refrigerant other than the flow of the injected refrigerant in the heating only operation mode during generation of heating load in the load-side heat exchanger 26. In FIG. 3, the solid arrows indicate the directions of the flowing refrigerant.

With reference to FIG. 3, the low-temperature low-pressure refrigerant is compressed at the compressor 10 into high-temperature high-pressure gaseous refrigerant and is discharged from the compressor 10. The high-temperature high-pressure gaseous refrigerant discharged from the compressor 10 flows through the refrigerant flow-channel switcher 11 and flows out of the outdoor unit 1. The high-temperature high-pressure gaseous refrigerant flowing out of the outdoor unit 1 flows into the load-side heat exchanger 26 via the main pipe 5. The gaseous refrigerant flowing into the load-side heat exchanger 26 transfers heat to the indoor air and turns into liquid refrigerant while heating the indoor air. The liquid refrigerant flowing out of the load-side heat exchanger 26 expands at the load-side expansion device 25 into intermediate-temperature intermediate-pressure refrigerant in a two-phase gas-liquid state and returns to the outdoor unit 1 via the main pipe 5. The intermediate-temperature intermediate-pressure refrigerant in a two-phase gas-liquid state flowing in the outdoor unit 1 flows into the heat-source-side heat exchanger 12 and receives heat from the outdoor air at the heat-source-side heat exchanger 12 to turn into low-temperature low-pressure gaseous refrigerant. The low-temperature low-pressure gaseous refrigerant returns to the compressor 10 via the refrigerant flow-channel switcher 11 and the accumulator 19.

[Flow During Injection]

(Required Injection and Overview of Effect)

Described below is a method of reducing the discharge temperature to prevent degradation of refrigerating machine oil and burnout of the compressor 10 due to the high discharge temperature of the compressor 10. In the description below, refrigerant R32 is used.

Figure 4:
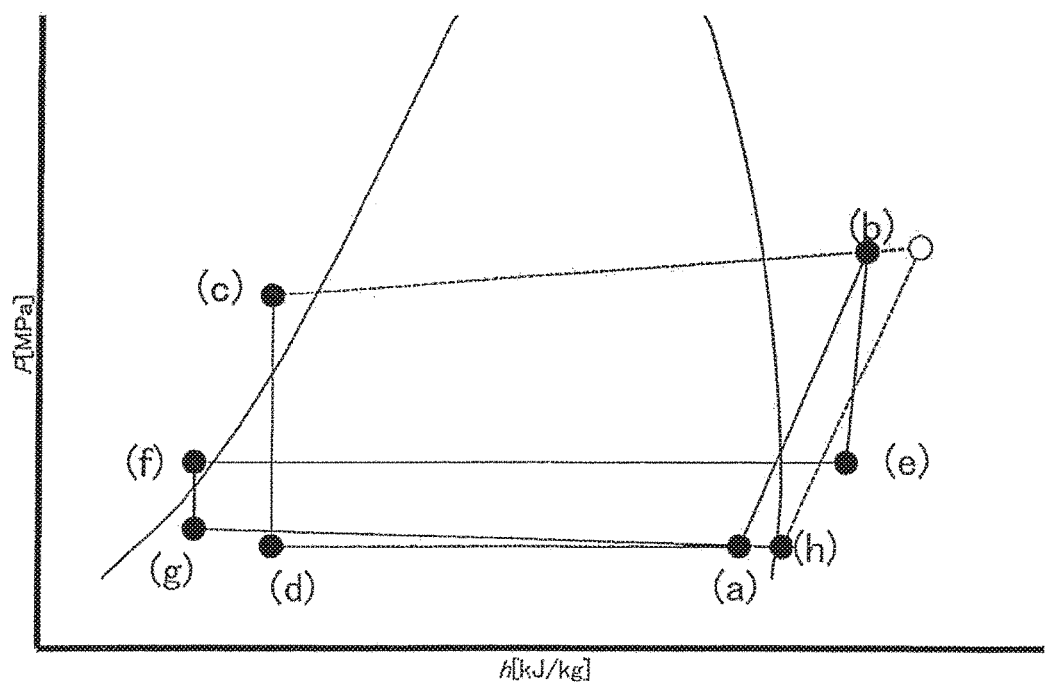
FIG. 4 is a Mollier diagram illustrating the state of the refrigerant during injection to a suction portion of a compressor 10 of the air-conditioning apparatus 100 according to Embodiment 1 of the present invention.

FIG. 4 is a Mollier diagram illustrating the state of the refrigerant during injection to the suction portion of the compressor 10. In FIG. 4, the horizontal axis represents specific enthalpy h [kJ/kg], and the vertical axis represents pressure P [MPa]. The effect of injection will be described below with reference to FIG. 4. A portion of the high-pressure gaseous refrigerant (b) flowing out of the compressor 10 is depressurized at the first expansion device 47 or at both the first expansion device 47 and the third expansion device 48 into intermediate-pressure gaseous refrigerant (e). The intermediate-pressure gaseous refrigerant flows into the auxiliary heat exchanger 40 via the bypass pipe 41 and is cooled into a subcooled liquid (f) by heat transfer to the outdoor air. The subcooled liquid refrigerant is depressurized at the second expansion device 42 into low-pressure refrigerant in a two-phase state (g) and flows into the suction portion of the compressor 10. At the suction portion of the compressor 10, the gaseous refrigerant (h) flowing out of the accumulator 19 is combined (a) with the two-phase refrigerant (g) depressurized at the second expansion device 42. This configuration can decrease the temperature of the refrigerant discharged from the compressor 10 (b). Thus, degradation of the refrigerating machine oil and burnout of the compressor 10 can be prevented.

(Control of Second Expansion Device 42)

The control of the second expansion device 42 in the cooling only operation mode and the heating only operation mode will be described below. The controller 60 controls the opening degree of the second expansion device 42 on the basis of the discharge temperature of the compressor 10 measured by the discharge temperature sensor 43. A large opening degree (opening port area) of the second expansion device 42 increases the volume of the subcooled liquid refrigerant flowing from the auxiliary heat exchanger 40 into the suction portion of the compressor 10 and decreases the discharge temperature of the compressor 10. A small opening degree (opening port area) of the second expansion device 42 reduces the volume of the subcooled liquid refrigerant flowing from the auxiliary heat exchanger 40 into the suction portion of the compressor 10 and increases the discharge temperature of the compressor 10.

The controller 60 fully closes the second expansion device 42 at a discharge temperature of the compressor 10 measured by the discharge temperature sensor 43 lower than or equal to a predetermined discharge temperature threshold (hereinafter, also referred to as "first value"). The fully closed second expansion device 42 blocks the flow channel of the refrigerant flowing from the auxiliary heat exchanger 40 into the suction portion of the compressor 10 via the bypass pipe 41 (bypass). The first value is selected depending on the upper limit of the discharge temperature of the compressor 10 that causes burnout of the compressor 10 or degradation of the refrigerating machine oil. For example, the first value is determined to be a temperature lower than the upper limit so that the discharge temperature measured by the discharge temperature sensor 43 does not reach the upper limit of the discharge temperature of the compressor 10. When the upper limit of the discharge temperature of the compressor 10 is 120 degrees C., the first value is 110 degrees C. or lower, for example.

When the discharge temperature is higher than the first value, the controller 60 opens the second expansion device 42 so that the refrigerant subcooled at the auxiliary heat exchanger 40 flows into the suction portion of the compressor 10. At this time, the controller 60 controls the opening degree (opening port area) of the second expansion device 42 to achieve a discharge temperature lower than or equal to the first value. The ROM of the controller 60, for example, stores a look-up table or formula correlating the discharge temperature and the opening degree of the second expansion device 42. The controller 60 refers to the look-up table or formula and controls the opening degree of the second expansion device 42 with reference to the discharge temperature. As described above, the low-temperature low-pressure gaseous refrigerant flowing out of the accumulator 19 is mixed with the liquid refrigerant subcooled at the auxiliary heat exchanger 40 at the suction portion of the compressor 10, into a high-quality low-pressure refrigerant in a two-phase gas-liquid state. The compressor 10 sucks the high-quality low-pressure refrigerant in a two-phase gas-liquid state.

(Operation and Effect of Injection)

Such a reduction in enthalpy of the refrigerant flowing in the compressor 10 can reduce an excess rise in the discharge temperature of the compressor 10. This operation can further reduce the degradation of the refrigerating machine oil, thereby preventing damage of the compressor 10. The long-term reliability of the compressor 10 can thereby be enhanced. Thus, a reliable system can be provided even with an inexpensive compressor without a special structure. A reduction in excess rise in the discharge temperature of the compressor 10 can increase the rotation frequency of the compressor 10. Such a configuration can achieve high heating capacity and enhance comfort of the user.

(Control and Effect of First Expansion Device 47 and Third Expansion Device 48)

The first expansion device 47 depressurizes a portion of the high-pressure gaseous refrigerant discharged from the compressor 10 to intermediate pressure. The gaseous refrigerant depressurized at the first expansion device 47 turns into an intermediate-pressure subcooled liquid at the auxiliary heat exchanger 40. The intermediate-pressure subcooled liquid flowing in the second expansion device 42 reduces a difference in pressure between the upstream and downstream ends of the second expansion device 42. Thus, the second expansion device 42 can have a large flow channel. That is, a small injection volume required for achieving a discharge temperature of the compressor 10 lower than or equal to the first value does not require a reduction in size of the second expansion device 42. This configuration can prevent dogging of the flow channel of the second expansion device 42 with foreign matter such as dirt, thereby preventing unstable control of the discharge temperature of the compressor 10 due to malfunctioning of the second expansion device 42.

The third expansion device 48 controls the intermediate pressure of the refrigerant depressurized at the first expansion device 47 in response to an increase in the required injection volume. The controller 60 calculates the density of saturated gas in the suction portion of the compressor 10 on the basis of the pressure at the suction portion of the compressor 10 measured by the pressure sensor 44. The controller 60 calculates the refrigerant circulation volume Gr2 of the compressor 10 on the basis of the density of saturated gas and the operational frequency of the compressor 10 and calculates the maximum refrigerant circulation volume Grmax of the compressor 10 on the basis of the density of saturated gas and the maximum operable frequency of the compressor 10. The controller 60 opens the third expansion device 48 when the ratio Gr2/Grmax of the refrigerant circulation volume Gr2 to the maximum refrigerant circulation volume Grmax reaches or exceeds a predetermined value (hereinafter, referred to as "second value").

(Setting of Second Value)

Figure 5:
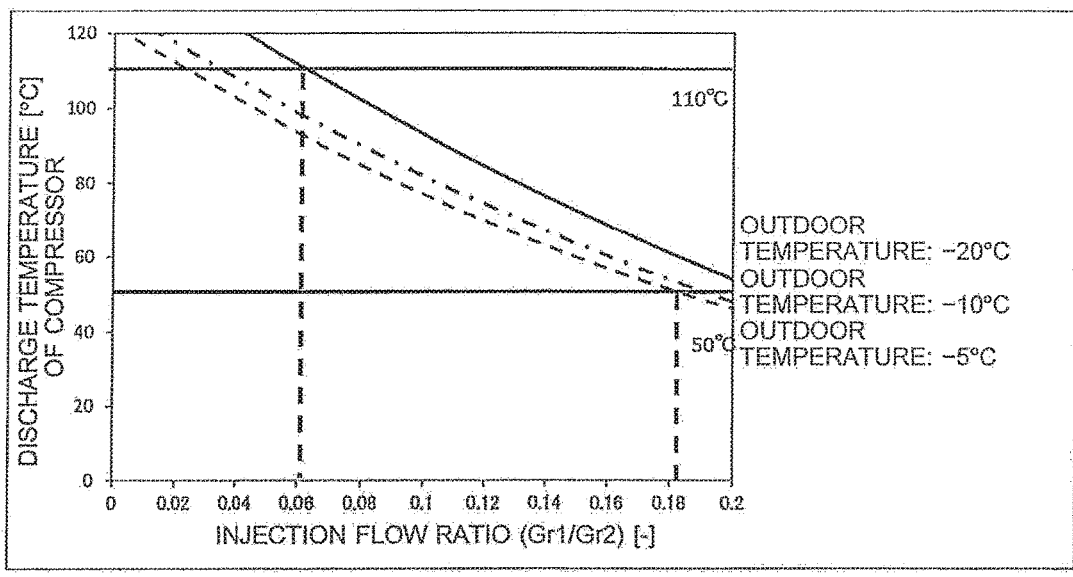
FIG. 5 is a graph illustrating a variation in the discharge temperature of the compressor 10 versus the injection flow ratio Gr1/Gr2 at different outdoor temperatures during a heating operation of the air-conditioning apparatus 100 according to Embodiment 1 of the present invention.

FIG. 5 is a graph illustrating variations in the discharge temperature of the compressor 10 versus the injection flow ratio Gr1/Gr2 at different outdoor temperatures during a heating operation at low outdoor temperatures. The horizontal axis represents the injection flow ratio Gr1/Gr2 (dimensionless), and the vertical axis represents the discharge temperature [degrees C.] of the compressor 10. In the graph, the solid curved line represents a variation in the discharge temperature at an outdoor temperature of −20 degrees C., the dash-dot curved line represents a variation in the discharge temperature at an outdoor temperature of −10 degrees C., and the dashed curved line represents a variation in the discharge temperature at an outdoor temperature of −5 degrees C. The injection flow ratio Gr1/Gr2 is defined by dividing the injection volume Gr1 [kg/h] by the refrigerant circulation volume Gr2 [kg/h]. The refrigerant used is R32. The enthalpy of the injected liquid refrigerant, the enthalpy of the gaseous refrigerant at the suction portion of the compressor 10, the adiabatic efficiency of the compressor 10, the volumetric efficiency of the compressor 10, and the compression ratio of the compressor 10 are presumed to be substantially constant regardless of a variation in refrigerant circulation volume Gr2.

With reference to FIG. 5, an injection flow ratio Gr1/Gr2 of approximately 0.06 or more during a heating operation can reduce the discharge temperature of the compressor 10 to 110 degrees C. or lower. A large injection flow ratio Gr1/Gr2 causes an excessive volume of floodback to the compressor 10, and an excessive decrease in discharge temperature of the compressor 10. A decrease in viscosity of the refrigerating machine oil in the compressor 10 caused by dilution of the refrigerating machine oil by the liquid refrigerant may cause damage to the compressor 10. Thus, the maximum injection flow ratio Gr1/Gr2 should be determined so that the degree of discharge superheat is to be 10 degrees C., which is a difference between the discharge temperature of the compressor 10 and the saturation temperature calculated on the basis of the discharge pressure of the compressor 10, for example. The graph in FIG. 5 illustrates a saturation temperature of 40 degrees C. In such a case, the maximum injection flow ratio Gr1/Gr2 should be determined so that the discharge temperature of the compressor 10 is to be 50 degrees C. With reference to FIG. 5, an injection volume ratio Gr1/Gr2 below approximately 0.18 during a heating operation can achieve a discharge temperature of the compressor 10 of 50 degrees C. or higher.

That is, the dimensions (diameters, for example) of the first expansion device 47 and the third expansion device 48 and the variable range of the opening port area of the second expansion device 42 should be determined so that the injection flow ratio Gr1/Gr2 is within the range of 0.06 to 0.18 (0.06≤Gr1/Gr2≤0.18). A heating operation within the operational range of the air-conditioning apparatus at a low outdoor temperature leads to a large compression ratio. This large compression ratio causes a ready increase in the discharge temperature and thus, an increase in the frequency of injection. Thus, the dimensions of the first expansion device 47 and the third expansion device 48 and the variable range of the opening port area of the second expansion device 42 should be determined under the condition of a heating operation at a low outdoor temperature (0 degrees C. or lower, for example).

Figure 6:
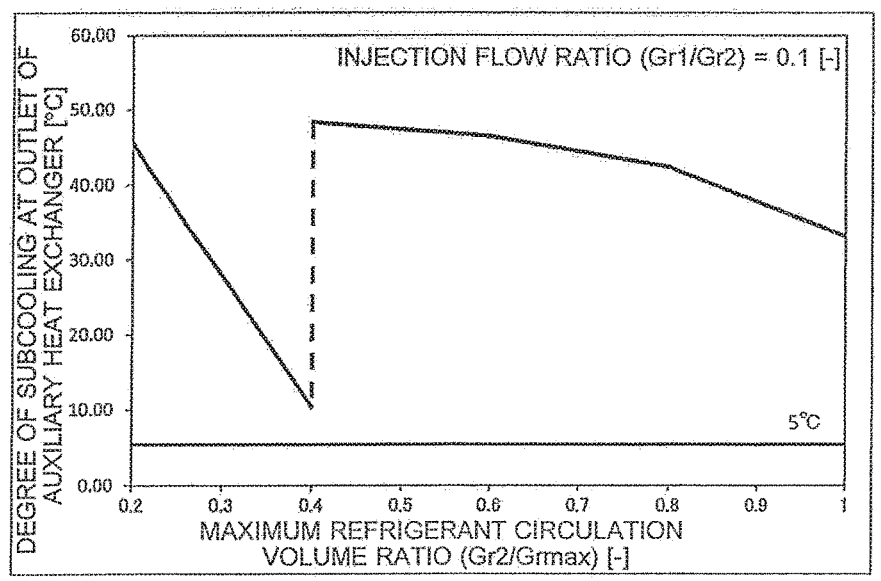
FIG. 6 is a graph illustrating the maximum refrigerant circulation volume ratio Gr2/Grmax versus the degree of subcooling of the liquid refrigerant at the outlet of an auxiliary heat exchanger 40 of the air-conditioning apparatus 100 according to Embodiment 1 of the present invention.

The refrigerant circulation volume Gr2 varies in response to the number of operating indoor units 2 or a variation in the indoor environmental load. FIG. 6 is a graph illustrating the maximum refrigerant circulation volume ratio Gr2/Grmax versus the variation in the degree of subcooling of liquid refrigerant at the outlet of the auxiliary heat exchanger 40. The horizontal axis of the graph represents a maximum refrigerant circulation volume ratio Gr2/Grmax (dimensionless), and the vertical axis represents the degree of subcooling [degrees C.] at the outlet of the auxiliary heat exchanger 40. The maximum refrigerant circulation volume ratio Gr2/Grmax is determined by dividing the refrigerant circulation volume Gr2 of the compressor 10 in the current operation mode by the maximum refrigerant circulation volume Grmax, which is calculated on the basis of the suction density (density of saturated gas) in the current operation mode and the maximum operable frequency of the compressor 10. The refrigerant used is R32. The enthalpy of the gaseous refrigerant at the suction portion of the compressor 10, the adiabatic efficiency of the compressor 10, the volumetric efficiency of the compressor 10, and the compression ratio of the compressor 10 are presumed to be substantially constant regardless of a variation in the refrigerant circulation volume Gr2. The dimensions of the first expansion device 47 and the third expansion device 48 and the variable range in the opening port area of the second expansion device 42 are determined so that the injection flow ratio Gr1/Gr2 is approximately 0.1, to avoid the dilution of the refrigerating machine oil in the compressor 10 due to floodback. An injection flow ratio Gr1/Gr2 of 0.1 achieves a discharge temperature of 100 degrees C. or lower even when the outdoor temperature is −20 degrees C. (see FIG. 5).

With reference to FIG. 6, as the maximum refrigerant circulation volume ratio Gr2/Grmax increases, the degree of subcooling at the outlet of the auxiliary heat exchanger 40 decreases (within the range of Gr2/Grmax≤0.4 in FIG. 6). This operation can be explained as below. A large refrigerant circulation volume Gr2 increases the injection flow rate Gr1, thereby expanding the range of depressurization at the first expansion device 47 and decreasing the saturation temperature of the intermediate-pressure gaseous refrigerant flowing into the auxiliary heat exchanger 40. This operation decreases a difference in temperature between the outdoor temperature and the saturation temperature of the intermediate-pressure refrigerant. Thus, the degree of subcooling of the liquid refrigerant at the outlet of the auxiliary heat exchanger 40 decreases.

A small degree of subcooling of the liquid refrigerant at the outlet of the auxiliary heat exchanger 40 brings the refrigerant at the outlet of the auxiliary heat exchanger 40 into a two-phase state. The two-phase refrigerant flows into the second expansion device 42, causing unstable control. Thus, the liquid refrigerant should be certainly supplied to the second expansion device 42. The saturation temperature of the intermediate-pressure gaseous refrigerant flowing into the auxiliary heat exchanger 40 can be increased by opening the third expansion device 48. The opening of the third expansion device 48 decreases the range of depressurization at the first expansion device 47 and the third expansion device 48. Thus, the liquid refrigerant at the outlet of the auxiliary heat exchanger 40 can have a sufficient degree of subcooling. With reference to FIG. 6, when the maximum refrigerant circulation volume ratio Gr2/Grmax increases to approximately 0.4, the degree of subcooling of the liquid refrigerant at the outlet of the auxiliary heat exchanger 40 decreases to approximately 10 degrees C. Thus, a sufficient degree of subcooling of the liquid refrigerant at the outlet of the auxiliary heat exchanger 40 can be achieved by opening the third expansion device 48 when the maximum refrigerant circulation volume ratio Gr2/Grmax reaches 0.4. That is, the second value is 0.4 for the refrigerant R32.

In FIGS. 5 and 6, the refrigerant used is R32. Alternatively, other refrigerants such as R410A may be used in the embodiments. The concept described above can be applied to reduce the discharge temperature during a heating operation at a low outdoor temperature in use of any other refrigerant.

(Control Flow Chart)

Figure 7:
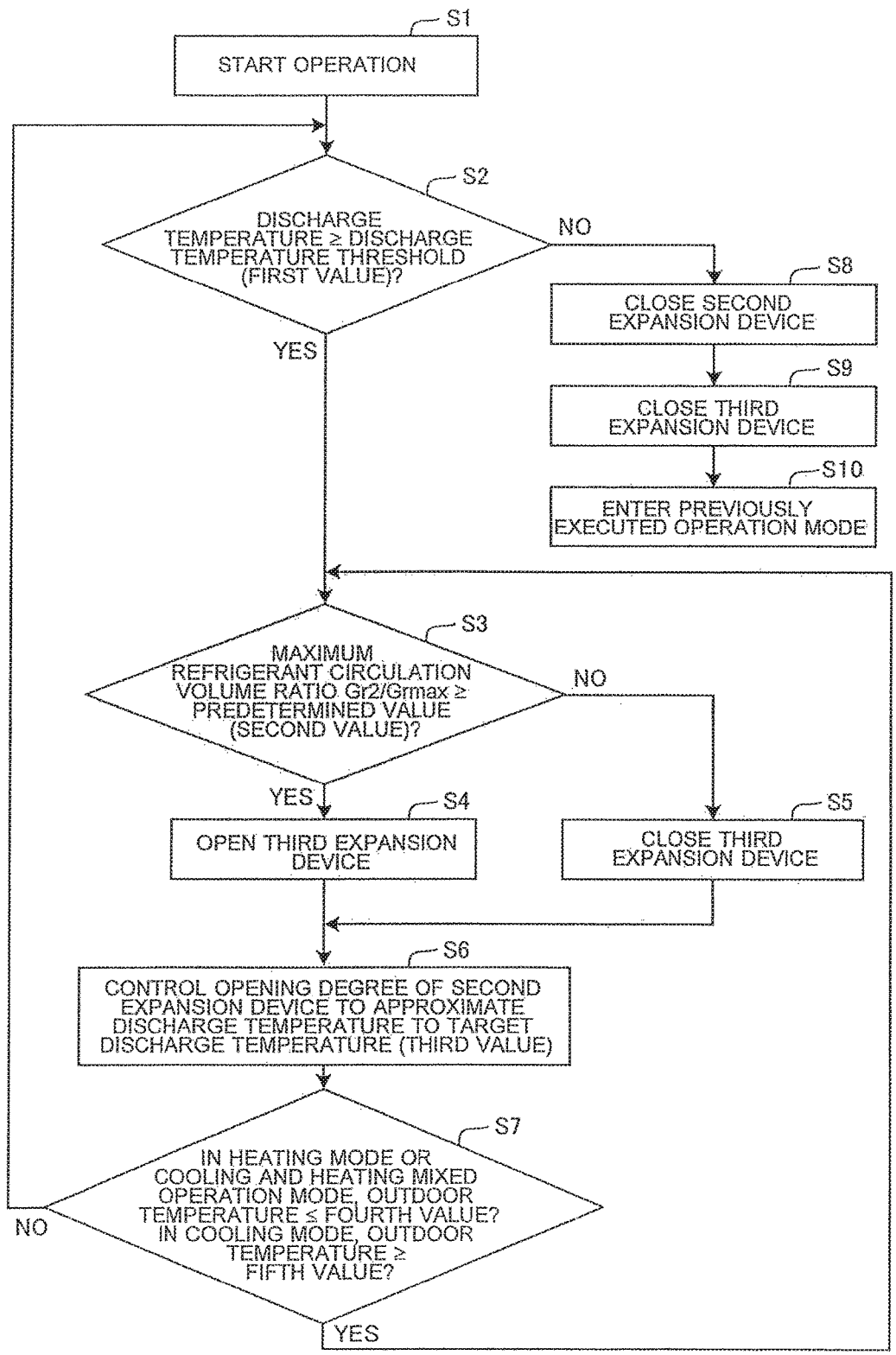
FIG. 7 is a flow chart illustrating an example control process executed by a controller 60 during injection in the air-conditioning apparatus 100 according to Embodiment 1 of the present invention.

FIG. 7 is a flow chart illustrating an example control process executed by the controller 60 during injection. The operation of the controller 60 during injection will be described below with reference to FIG. 7.

(Step S1)

The controller 60 starts the operation of the air-conditioning apparatus 100 in response to a request for a cooling or heating operation from the indoor unit 2. The process then goes to Step S2.

(Step S2)

The controller 60 acquires the discharge temperature of the compressor 10 measured by the discharge temperature sensor 43 and determines whether the discharge temperature of the compressor 10 is higher than or equal to the first value (110 degrees C., for example). When the discharge temperature is higher than or equal to the first value (discharge temperature 2 first value), the process goes to Step S3. When the discharge temperature is lower than the first value (discharge temperature<first value), the process goes to Step S8.

(Step S3)

The controller 60 calculates the density of saturated gas in the suction portion of the compressor 10 on the basis of the pressure at the suction portion of the compressor 10 measured by the pressure sensor 44. The controller 60 also calculates the refrigerant circulation volume Gr2 of the compressor 10 on the basis of the density of saturated gas and the operational frequency of the compressor 10, and calculates the maximum refrigerant circulation volume Grmax of the compressor 10 on the basis of the density of saturated gas and the maximum operable frequency of the compressor 10. The controller 60 also calculates the maximum refrigerant circulation volume ratio Gr2/Grmax, which is determined by dividing the refrigerant circulation volume Gr2 by the maximum refrigerant circulation volume Grmax, and determines whether the maximum refrigerant circulation volume ratio Gr2/Grmax is larger than or equal to the second value (0.4, for example). When the maximum refrigerant circulation volume ratio Gr2/Grmax is larger than or equal to the second value (Gr2/Grmax≥second value), the process goes to Step S4. When the maximum refrigerant circulation volume ratio Gr2/Grmax is smaller than the second value (Gr2/Grmax<second value), the process goes to Step S5.

(Step S4)

The controller 60 opens the third expansion device 48. When the third expansion device 48 is already open, the opened state is maintained. In Step S4, the third expansion device 48 is fully open, for example. The process then goes to Step S6.

(Step S5)

The controller 60 closes the third expansion device 48. When the third expansion device 48 is already closed, the closed state is maintained. In Step S5, the third expansion device 48 is fully closed, for example. The process then goes to Step S6.

(Step S6)

The controller 60 controls the opening degree of the second expansion device 42 so that the discharge temperature of the compressor 10 measured by the discharge temperature sensor 43 approximates a third value (target discharge temperature). To prevent the discharge temperature of the compressor 10 from exceeding the first value, the third value is set to a temperature lower than the first value (100 degrees C., for example). For example, when the discharge temperature of the compressor 10 is higher than the third value, the controller 60 increases the opening degree of the second expansion device 42. When the discharge temperature of the compressor 10 is lower than the third value, the controller 60 decreases the opening degree of the second expansion device 42. When the discharge temperature of the compressor 10 is within a range including the third value (100 degrees C.±1 degree C., for example), the controller 60 maintains the opening degree of the second expansion device 42. In Step S6, a required volume of refrigerant is injected to the suction portion of the compressor 10. The process then goes to Step S7.

(Step S7)

In the heating operation mode (or a cooling and heating mixed operation mode described below), the controller 60 determines whether the outdoor temperature measured by the outdoor temperature sensor 46 is lower than or equal to a fourth value (0 degrees C., for example). When the outdoor temperature is lower than or equal to the fourth value (outdoor temperature≤fourth value), the process goes to Step S3. When the outdoor temperature is higher than the fourth value (outdoor temperature>fourth value), the process goes to Step S2.

In the cooling operation mode, the controller 60 determines whether the outdoor temperature is higher than or equal to a fifth value (40 degrees C., for example). When the outdoor temperature is higher than or equal to the fifth value (outdoor temperature≥fifth value), the process goes to Step S3. When the outdoor temperature is lower than the fifth value (outdoor temperature<fifth value), the process goes to Step S2.

(Step S8)

The controller 60 closes the second expansion device 42. When the second expansion device 42 is already closed, the closed state is maintained. In Step S8, the second expansion device 42 is fully closed, for example. The process then goes to Step S9.

(Step S9)

The controller 60 closes the third expansion device 48. When the third expansion device 48 is already closed, the closed state is maintained. In Step S9, the third expansion device 48 is fully closed, for example. The process then goes to Step S10.

(Step S10)

The controller 60 completes the injection operation and returns to the previous operation mode.

Embodiment 2

Figure 8:
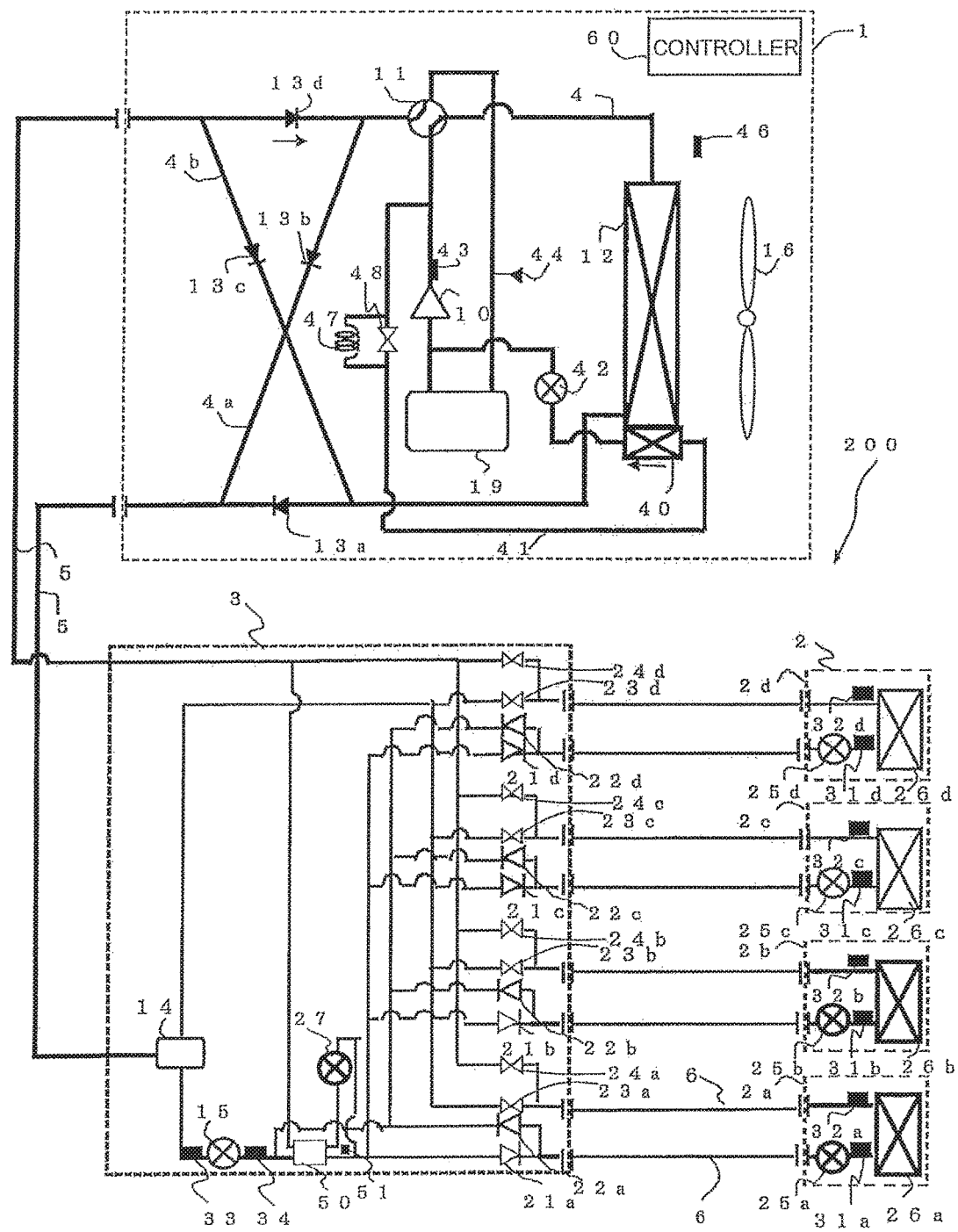
FIG. 8 is a schematic circuit diagram illustrating an example configuration of the circuit of an air-conditioning apparatus 200 according to Embodiment 2 of the present invention.

An air-conditioning apparatus according to Embodiment 2 of the present invention will be described below. FIG. 8 is a schematic circuit diagram illustrating an example configuration of the circuit of an air-conditioning apparatus 200 according to this embodiment. Components that have the same functions and operations as those according to Embodiment 1 are indicated by the same reference signs, and descriptions of the components are omitted.

With reference to FIG. 8, the air-conditioning apparatus 200 includes an outdoor unit 1, which is a heat source unit, indoor units 2a, 2b, 2c, and 2d, and a relay unit 3, which is disposed between the outdoor unit 1 and the indoor units 2a to 2d and includes a switching device. The outdoor unit 1 and the relay unit 3 are connected via main pipes 5 for feeding refrigerant. The relay unit 3 and each of the indoor units 2a to 2d are connected with branching pipes 6 for feeding the refrigerant. Cooling energy or heating energy generated at the outdoor unit 1 is transferred to the indoor units 2a to 2d via the relay unit 3.

According to this embodiment, the outdoor unit 1 and the relay unit 3 are connected with two main pipes 5, and the relay unit 3 and each of the indoor units 2a to 2d are connected with two branching pipes 6. The two-pipe connection between the outdoor unit 1 and the relay unit 3 and between the relay unit 3 and each of the indoor units 2a to 2d facilitates the assembly of the air-conditioning apparatus 200.

[Outdoor Unit 1]

Similar to Embodiment 1, the outdoor unit 1 includes a compressor 10, a refrigerant flow-channel switcher 11, a heat-source-side heat exchanger 12, an accumulator 19, an auxiliary heat exchanger 40, a first expansion device 47, a second expansion device 42, a third expansion device 48, a bypass pipe 41, and a heat-source-side fan 16.

The outdoor unit 1 further includes a first connection pipe 4a, a second connection pipe 4b, and first backflow preventers 13a, 13b, 13c, and 13d. In this embodiment, the first backflow preventers 13a to 13d are check valves. The first backflow preventer 13a prevents backflow of high-temperature high-pressure gaseous refrigerant from the first connection pipe 4a to the heat-source-side heat exchanger 12 during a heating only operation mode and a heating main operation mode. The first backflow preventer 13b prevents backflow of refrigerant in a high-pressure liquid state or a two-phase gas-liquid state from the first connection pipe 4a to the accumulator 19 during a cooling only operation mode and a cooling main operation mode. The first backflow preventer 13c prevents backflow of refrigerant in a high-pressure liquid state or in a two-phase gas-liquid state from the second connection pipe 4b to the accumulator 19 during a cooling only operation mode and a cooling main operation mode. The first backflow preventer 13d prevents backflow of high-temperature high-pressure gaseous refrigerant from the flow channel on the discharge side of the compressor 10 to the second connection pipe 4b during a heating only operation mode and a heating main operation mode.

The first connection pipe 4a, the second connection pipe 4b, and the first backflow preventers 13a to 13d can limit the direction of the flowing refrigerant fed to the relay unit 3 to a predetermined direction in any operation required by the indoor unit 2. The first backflow preventers 13a to 13d are check valves in this embodiment. Alternatively, the first backflow preventers 13a to 13d may be any component that can prevent backflow of the refrigerant. For example, the first backflow preventers 13a to 13d may be switching devices or expansion devices that can be fully closed.

[Indoor Units 2a to 2d]

The indoor units 2a to 2d have the same configuration, for example. The indoor units 2a to 2d, respectively, include load-side heat exchangers 26a to 26d and load-side expansion devices 25a to 25d. The load-side heat exchangers 26a to 26d are connected to the outdoor unit 1 via the branching pipes 6, the relay unit 3, and the main pipes 5. The load-side heat exchangers 26a to 26d each heat or cool air for heating or cooling to be fed to the indoor space through heat exchange between air sent from a load-side fan (not shown) and the refrigerant. The load-side expansion devices 25a to 25d each have a variable opening degree that can be controlled continuously or stepwise, for example. The load-side expansion devices 25a to 25d are electronic expansion valves, for example. The load-side expansion devices 25a to 25d act as pressure reducing valves and expansion valves and depressurize and expand the refrigerant. The load-side expansion devices 25a to 25d are respectively disposed upstream of the load-side heat exchangers 26a to 26d along the flow of the refrigerant in a cooling operation mode (cooling only operation mode, for example).

The indoor units 2 are provided with inlet temperature sensors 31a to 31d measuring the temperature of the refrigerant flowing into the load-side heat exchangers 26a to 26d, respectively, and outlet temperature sensors 32a to 32d measuring the temperature of the refrigerant flowing out of the load-side heat exchangers 26a to 26d, respectively. The inlet temperature sensors 31a to 31d and the outlet temperature sensors 32a to 32d are thermistors, for example. The inlet temperature sensors 31a to 31d and the outlet temperature sensors 32a to 32d each output measurement signals to the controller 60.

FIG. 8 illustrates four indoor units 2a to 2d. Alternatively, the number of indoor units may be less or more than four.

[Relay Unit 3]

The relay unit 3 is provided with a gas-liquid separator 14, a refrigerant heat exchanger 50, a fourth expansion device 15, a fifth expansion device 27, first switching devices 23a, 23b, 23c, and 23d, second switching devices 24a, 24b, 24c, and 24d, second backflow preventers 21a, 21b, 21c, and 21d (check valves, for example), and third backflow preventers 22a, 22b, 22c, and 22d (check valves, for example).

The gas-liquid separator 14 in a cooling and heating mixed operation mode involving a large cooling load separates refrigerant brought into a high-pressure two-phase gas-liquid state in the outdoor unit 1 into liquid refrigerant and gaseous refrigerant. The gas-liquid separator 14 feeds the separated liquid refrigerant to the pipe illustrated in the bottom portion of the drawing, supplies cooling energy to some of the indoor units 2, feeds the separated gaseous refrigerant to the pipes illustrated in the top portion of the drawing, and supplies heating energy to the other indoor units 2. The gas-liquid separator 14 is provided at the inlet portion of the relay unit 3 along the flow of the refrigerant.

The refrigerant heat exchanger 50 is a double-pipe heat exchanger or a plate heat exchanger, for example. The refrigerant heat exchanger 50 exchanges heat between the high-pressure or intermediate-pressure refrigerant and the low-pressure refrigerant depressurized at the fifth expansion device 27 in the cooling only operation mode and the cooling and heating mixed operation mode (including the cooling main operation mode and the heating main operation mode), to achieve a sufficient degree of subcooling of the refrigerant in a liquid state or in a two-phase gas-liquid state fed to the load-side expansion devices 25a to 25d of the indoor units 2a to 2d receiving a cooling load. The high-pressure-side flow channel of the refrigerant heat exchanger 50 is defined between the fourth expansion device 15 and the second backflow preventers 21a to 21d. The high-pressure or intermediate-pressure refrigerant flowing through the fourth expansion device 15 flows through the high-pressure-side flow channel. The low-pressure-side flow channel of the refrigerant heat exchanger 50 connects the low-pressure pipe of the outlet of the relay unit 3 and a portion between the outlet of the high-pressure-side flow channel of the refrigerant heat exchanger 50 and the second backflow preventers 21a to 21d. The low-pressure refrigerant that flows through the high-pressure-side flow channel, branches from the refrigeration cycle, and is depressurized at the fifth expansion device 27 flows into the low-pressure-side flow channel.

The fourth expansion device 15 acts as a pressure reducing valve and a check valve. The fourth expansion device 15 depressurizes the liquid refrigerant to a predetermined pressure and opens or closes the flow channel of the liquid refrigerant. The fourth expansion device 15 has a variable opening degree that can be controlled continuously or stepwise, for example. The fourth expansion device 15 is an electronic expansion valve, for example. The fourth expansion device 15 is disposed on the pipe for the liquid refrigerant flowing out of the gas-liquid separator 14.

The fifth expansion device 27 acts as a pressure reducing valve and a check valve. The fifth expansion device 27 opens or closes the refrigerant flow channel in the heating only operation mode and controls the flow rate of the bypass liquid depending on the indoor-side load in the heating main operation mode. The fifth expansion device 27 feeds the refrigerant to the low-pressure-side flow channel of the refrigerant heat exchanger 50 and controls the degree of subcooling of the refrigerant fed to the load-side expansion devices 25a to 25d of the indoor units 2 receiving the cooling load in the cooling only operation mode, the cooling main operation mode, and the heating main operation mode. The fifth expansion device 27 has a variable opening degree that can be controlled continuously or stepwise, for example. The fifth expansion device 27 is an electronic expansion valve, for example. The fifth expansion device 27 is disposed on the inlet side of the low-pressure-side flow channel of the refrigerant heat exchanger 50.

The first switching devices 23a to 23d are provided on the respective indoor units 2a to 2d (four units in this embodiment). The first switching devices 23a to 23d open or close the flow channels feeding the high-temperature high-pressure gaseous refrigerant to the respective indoor units 2a to 2d. The first switching devices 23a to 23d are solenoid valves, for example. The first switching devices 23a to 23d are connected to the gas-side pipe of the gas-liquid separator 14. The first switching devices 23a to 23d may be expansion devices that can be fully closed as long as the expansion devices can open and close the flow channels.

The second switching devices 24a to 24d are provided on the respective indoor units 2a to 2d (four units in this embodiment). The second switching devices 24a to 24d open or close the flow channels of the low-temperature low-pressure gaseous refrigerant from the respective indoor units 2a to 2d. The second switching devices 24a to 24d are solenoid valves, for example. The second switching devices 24a to 24d are connected to a low-pressure pipe in communication with the outlet-side of the relay unit 3. The second switching devices 24a to 24d may be expansion devices that can be fully closed as long as the expansion devices can open and close the flow channels.

The second backflow preventers 21a to 21d are provided on the respective indoor units 2a to 2d (four units in this embodiment). The second backflow preventers 21a to 21d feed high-pressure liquid refrigerant to the respective indoor units 2 that are performing a cooling operation and are connected to the pipe on the outlet side of the fourth expansion device 15. The cooling main operation mode and the heating main operation mode can thereby prevent feed of an intermediate-temperature intermediate-pressure refrigerant in a liquid state or in a two-phase gas-liquid state at an insufficient degree of subcooling from the load-side expansion devices 25a to 25d of the indoor units 2 that are performing a heating operation to the load-side expansion devices 25a to 25d of the indoor units 2 that are performing a cooling operation. In this embodiment, the second backflow preventers 21a to 21d are check valves. Alternatively, the second backflow preventers 21a to 21d may be any component that can prevent backflow of the refrigerant. The second backflow preventers 21a to 21d may be switching devices or expansion devices that can be fully closed, for example.

The third backflow preventers 22a to 22d are provided on the respective indoor units 2a to 2d (four units in this embodiment). The third backflow preventers 22a to 22d feed high-pressure liquid refrigerant to the indoor units 2 that are performing the cooling operation and are connected to the pipe on the outlet side of the fourth expansion device 15. The third backflow preventers 22a to 22d prevent feed of an intermediate-temperature intermediate-pressure refrigerant in a liquid state or in a two-phase gas-liquid state at an insufficient degree of subcooling from the fourth expansion device 15 to the load-side expansion devices 25a to 25d of the indoor units 2 that are performing the cooling operation in the cooling main operation mode and the heating main operation mode. In this embodiment, the third backflow preventers 22a to 22d are check valves. Alternatively, the third backflow preventers 22a to 22d may be any component that can prevent backflow of the refrigerant. The third backflow preventers 22a to 22d may be switching devices or expansion devices that can be fully closed, for example.

An inlet pressure sensor 33 is disposed in the relay unit 3 on the inlet side of the fourth expansion device 15. The inlet pressure sensor 33 measures the pressure of the high-pressure refrigerant. An outlet pressure sensor 34 is disposed on the outlet side of the fourth expansion device 15. The outlet pressure sensor 34 measures intermediate pressure of the liquid refrigerant on the outlet side of the fourth expansion device 15 in the cooling main operation mode.

A temperature sensor 51 that measures the temperature of refrigerant in a high-pressure or intermediate-pressure state flowing out of the refrigerant heat exchanger 50 is disposed in the relay unit 3. The temperature sensor 51 is disposed on the pipe on the outlet side of the high-pressure-side flow channel of the refrigerant heat exchanger 50. The temperature sensor 51 is a thermistor, for example.

The controller 60 comprehensively controls the air-conditioning apparatus 200 illustrated in FIG. 8 on the basis of measurement signals from the sensors and instructions from a remote controller. For example, the controller 60 controls the driving frequency of the compressor 10, the rotation frequencies of the heat-source side fan 16 and the load-side fan (including turning on and off of the fans), switching of the flow channel of the refrigerant flow-channel switcher 11, the opening degree of the second expansion device 42, the opening degree or the open-close state of the third expansion device 48, the opening degree of the load-side expansion devices 25, and the open-close state of the first switching devices 23a to 23d, the second switching devices 24a to 24d, the fourth expansion device 15, and the fifth expansion device 27, to execute the various operation modes described below. The controller 60 according to this embodiment is installed on the outdoor unit 1. Alternatively, the controller 60 may be installed in the indoor units 2a to 2d or the relay unit 3. Alternatively, multiple controllers 60 may be installed in all of the units (the outdoor unit 1, the indoor units 2a to 2d, and the relay unit 3, for example).

The operation modes executed by the air-conditioning apparatus 200 will be described below. The controller 60 of the air-conditioning apparatus 200 can independently control the cooling or heating operations of the indoor units 2a to 2d on the basis of instructions from the indoor units 2a to 2d. That is, the indoor units 2a to 2d of the air-conditioning apparatus 200 can perform the same operation (cooling or heating operation) or different operations.

The operation modes executed by the air-conditioning apparatus 200 are generally categorized into a cooling operation mode and a heating operation mode. The cooling operation mode includes a cooling only operation mode and a cooling main operation mode. In the cooling only operation mode, all of the indoor units 2a to 2d that are not at standstill perform the cooling operation. That is, in the cooling only operation mode, the load-side heat exchangers 26a to 26d that are not at standstill act as evaporators. The cooling main operation mode is a cooling and heating mixed operation mode involving a cooling operation of some of the indoor units 2a to 2d and a heating operation of the other indoor units 2a to 2d, and has a cooling load higher than a heating load. That is, in the cooling main operation mode, some of the load-side heat exchangers 26a to 26d act as evaporators, and the other load-side heat exchangers 26a to 26d act as condensers.

The heating operation mode includes a heating only operation mode and a heating main operation mode. In the heating only operation mode, all of the indoor units 2a to 2d that are not at standstill perform the heating operation. That is, in the heating only operation mode, all of the load-side heat exchangers 26a to 26d that are not at standstill act as condensers. The heating main operation mode is a cooling and heating mixed operation mode involving a cooling operation of some of the indoor units 2a to 2d and a heating operation of the other indoor units 2a to 2d, and has a heating load higher than a cooling load. The operation modes will be described below.

[Cooling Only Operation Mode]

Figure 9:
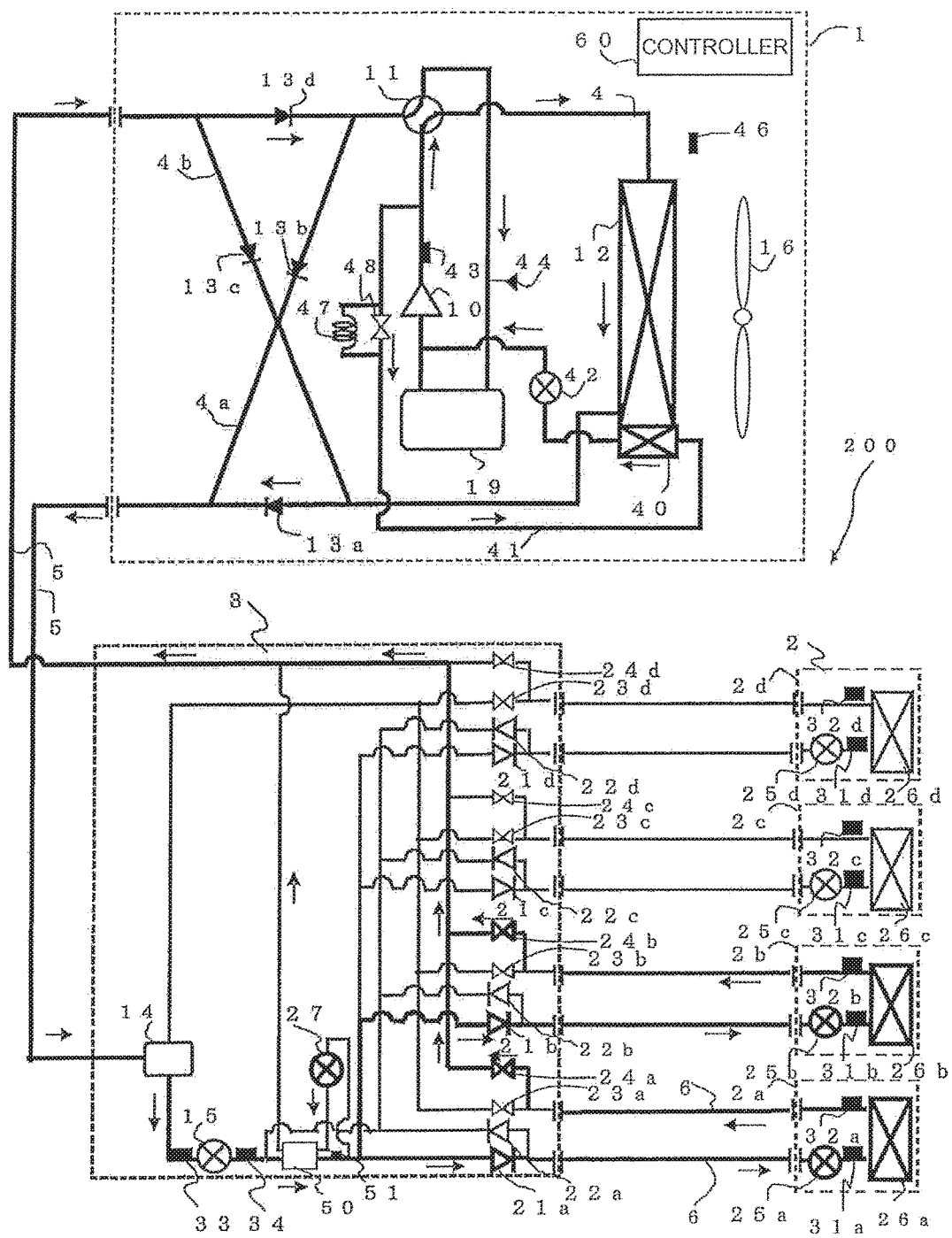
FIG. 9 is a refrigerant circuit diagram illustrating the flow of refrigerant in the air-conditioning apparatus 200 according to Embodiment 2 of the present invention in a cooling only operation mode.

FIG. 9 is a refrigerant circuit diagram illustrating the flow of the refrigerant in the air-conditioning apparatus 200 in the cooling only operation mode. In FIG. 9, the bold lines indicate the pipes through which the refrigerant flows, and the solid arrows indicate the direction of the flowing refrigerant. A cooling load is presumed to be generated in only the load-side heat exchangers 26a and 26b. In the cooling only operation mode, the controller 60 switches the refrigerant flow-channel switcher 11 of the outdoor unit 1 so that the refrigerant discharged from the compressor 10 flows into the heat-source-side heat exchanger 12.

The low-temperature low-pressure refrigerant is compressed by the compressor 10 and discharged in the form of high-temperature high-pressure gaseous refrigerant. The high-temperature high-pressure gaseous refrigerant discharged from the compressor 10 flows into the heat-source-side heat exchanger 12 via the refrigerant flow-channel switcher 11. The high-temperature high-pressure gaseous refrigerant transfers heat to the outdoor air at the heat-source-side heat exchanger 12 and turns into high-pressure liquid refrigerant. The high-pressure liquid refrigerant flowing out of the heat-source-side heat exchanger 12 flows through the first backflow preventer 13a, flows out of the outdoor unit 1, and flows into the relay unit 3 via the main pipe 5.

The high-pressure liquid refrigerant flowing into the relay unit 3 flows through the gas-liquid separator 14 and the fourth expansion device 15 and is sufficiently subcooled at the refrigerant heat exchanger 50. Most of the subcooled high-pressure refrigerant flows through the second backflow preventers 21a and 21b and the branching pipes 6 and expands into low-temperature low-pressure refrigerant in a two-phase gas-liquid state at the load-side expansion devices 25. The remaining high-pressure refrigerant expands into low-temperature low-pressure refrigerant in a two-phase gas-liquid state at the fifth expansion device 27. The low-temperature low-pressure refrigerant in a two-phase gas-liquid state exchanges heat with the high-pressure liquid refrigerant at the refrigerant heat exchanger 50, turns into low-temperature low-pressure gaseous refrigerant, and flows into the low-pressure pipe on the outlet side of the relay unit 3. The opening degree of the fifth expansion device 27 is controlled to achieve a constant degree of subcooling determined by the difference between the saturation temperature converted from the pressure measured by the outlet pressure sensor 34 and the temperature measured by the temperature sensor 51.

The refrigerant in a two-phase gas-liquid state expanding at the load-side expansion devices 25a and 25b flows into the respective load-side heat exchangers 26a and 26b acting as evaporators, receives heat from the indoor air, and turns into low-temperature low-pressure gaseous refrigerant while cooling the indoor air. At this time, the opening degree of the load-side expansion device 25a is controlled to achieve a constant degree of superheating determined by the difference between the temperature measured by the inlet temperature sensor 31a and the temperature measured by the outlet temperature sensor 32a. Similarly, the opening degree of the load-side expansion device 25b is controlled to achieve a constant degree of superheating determined by the difference between the temperature measured by the inlet temperature sensor 31b and the temperature measured by the outlet temperature sensor 32b.

The gaseous refrigerant flowing out of the load-side heat exchangers 26a and 26b flows through the corresponding branching pipe 6 and the respective second switching devices 24a and 24b, is combined with the gaseous refrigerant flowing out of the low-pressure-side flow channel of the refrigerant heat exchanger 50, flows out of the relay unit 3, and returns to the outdoor unit 1 via the main pipe 5. The refrigerant flowing into the outdoor unit 1 flows through the first backflow preventer 13d and returns to the compressor 10 via the refrigerant flow-channel switcher 11 and the accumulator 19.

The refrigerant needs not to be fed to the load-side heat exchangers 26c and 26d, which do not receive a heat load, and thus the respective load-side expansion devices 25c and 25d are closed. When a cooling load is applied to the load-side heat exchanger 26c (26d), the load-side expansion device 25c (25d) is opened to circulate the refrigerant. Similar to the load-side expansion device 25a (25b), the opening degree of the load-side expansion device 25c (25d) is controlled to achieve a constant degree of superheating determined by the difference between the temperature measured by the inlet temperature sensor 31c (31d) and the temperature measured by the outlet temperature sensor 32c (32d).

[Cooling Main Operation Mode]

Figure 10:
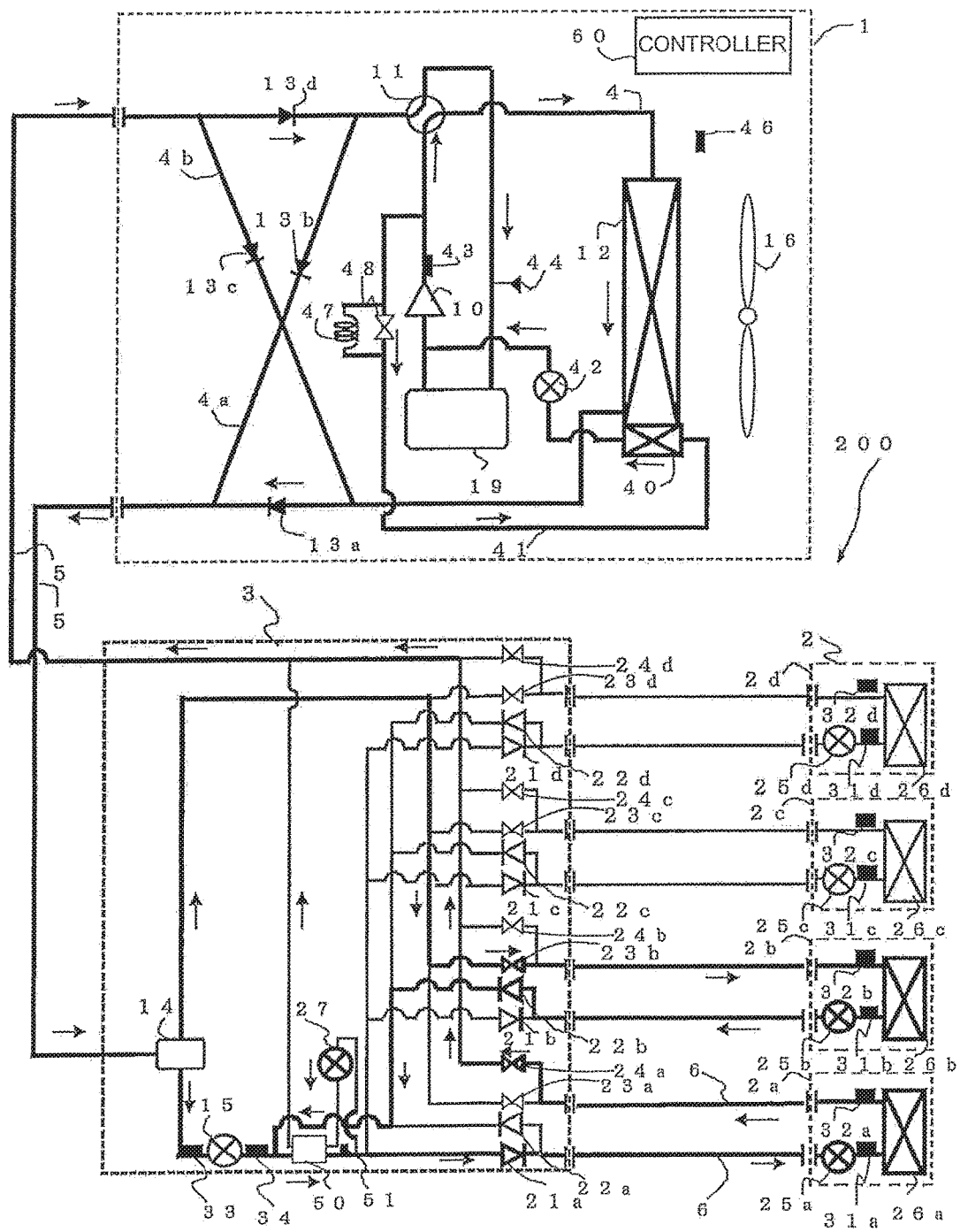
FIG. 10 is a refrigerant circuit diagram illustrating the flow of the refrigerant in the air-conditioning apparatus 200 according to Embodiment 2 of the present invention in a cooling main operation mode.

FIG. 10 is a refrigerant circuit diagram illustrating the flow of the refrigerant in the air-conditioning apparatus 200 in a cooling main operation mode. In FIG. 10, the solid lines indicate pipes through which the refrigerant circulates, and the solid arrows indicate the direction of the flowing refrigerant. A cooling load is presumed to be generated only in the load-side heat exchanger 26a, and a heating load is presumed to be generated only in the load-side heat exchanger 26b. In the cooling main operation mode, the controller 60 switches the refrigerant flow-channel switcher 11 so that the refrigerant discharged from the compressor 10 flows into the heat-source-side heat exchanger 12.

The low-temperature low-pressure refrigerant is compressed by the compressor 10 and discharged in the form of high-temperature high-pressure gaseous refrigerant. The high-temperature high-pressure gaseous refrigerant discharged from the compressor 10 flows into the heat-source-side heat exchanger 12 via the refrigerant flow-channel switcher 11. The gaseous refrigerant turns into refrigerant in a two-phase gas-liquid state while transferring heat to the outdoor air at the heat-source-side heat exchanger 12. The refrigerant flowing out of the heat-source-side heat exchanger 12 flows into the relay unit 3 via the first backflow preventer 13a and the main pipe 5.

The refrigerant in a two-phase gas-liquid state flowing into the relay unit 3 is separated into high-pressure gaseous refrigerant and high-pressure liquid refrigerant at the gas-liquid separator 14. The high-pressure gaseous refrigerant flows through the first switching device 23b and the corresponding branching pipe 6 to the load-side heat exchanger 26b acting as a condenser. The high-pressure gaseous refrigerant transfers heat to the indoor air and turns into liquid refrigerant while heating the indoor air. At this time, the opening degree of the load-side expansion device 25b is controlled to achieve a constant degree of subcooling determined by the difference between the saturation temperature converted from the pressure measured by the inlet pressure sensor 33 and the temperature measured by the inlet temperature sensor 31b. The liquid refrigerant flowing out of the load-side heat exchanger 26b expands at the load-side expansion device 25b and flows through the corresponding branching pipe 6 and the third backflow preventer 22b.

The liquid refrigerant separated at the gas-liquid separator 14 and expanding to an intermediate pressure at the fourth expansion device 15 is combined with the liquid refrigerant flowing through the third backflow preventer 22b. At this time, the opening degree of the fourth expansion device 15 is controlled so that the difference between the pressure measured by the inlet pressure sensor 33 and the pressure measured by the outlet pressure sensor 34 is a predetermined value (0.3 MPa, for example).

The combined liquid refrigerant is sufficiently subcooled at the refrigerant heat exchanger 50. A major portion of the subcooled refrigerant flows through the second backflow preventer 21a and the corresponding branching pipe 6 to the load-side expansion device 25a, where the liquid refrigerant expands into low-temperature low-pressure refrigerant in a two-phase gas-liquid state. The remaining portion of the liquid refrigerant expands in the fifth expansion device 27 into low-temperature low-pressure refrigerant in a two-phase gas-liquid state. At this time, the opening degree of the fifth expansion device 27 is controlled to achieve a constant degree of subcooling determined by the difference between the saturation temperature converted from the pressure measured by the outlet pressure sensor 34 and the temperature measured by the temperature sensor 51. The low-temperature low-pressure refrigerant in a two-phase gas-liquid state exchanges heat with the intermediate pressure liquid refrigerant at the refrigerant heat exchanger 50, turns into low-temperature low-pressure gaseous refrigerant, and flows into the outlet-side low-pressure pipe of the relay unit 3.

The high-pressure liquid refrigerant separated at the gas-liquid separator 14 flows into the indoor unit 2a via the refrigerant heat exchanger 50 and the second backflow preventer 21a. The refrigerant in a two-phase gas-liquid state expanding at the load-side expansion device 25a of the indoor unit 2a flows into the load-side heat exchanger 26a acting as an evaporator, receives heat from the indoor air, and turns into low-temperature low-pressure gaseous refrigerant while cooling the indoor air. At this time, the opening degree of load-side expansion device 25a is controlled to achieve a constant degree of superheating determined by the difference between the temperature measured by the inlet temperature sensor 31a and the temperature measured by the outlet temperature sensor 32b. The gaseous refrigerant flowing out of the load-side heat exchanger 26a flows through the corresponding branching pipe 6 and the second switching device 24a, and is combined with the remaining gaseous refrigerant flowing out of the refrigerant heat exchanger 50. The combined refrigerant flows out of the relay unit 3 and returns to the outdoor unit 1 via the main pipe 5. The refrigerant flowing into the outdoor unit 1 flows through the first backflow preventer 13d and returns to the compressor 10 via the refrigerant flow-channel switcher 11 and the accumulator 19.

The refrigerant needs not to be fed to the load-side heat exchangers 26c and 26d, which do not receive a heat load, and thus the respective load-side expansion devices 25c and 25d are closed. When a cooling load is applied to the load-side heat exchanger 26c (26d), the load-side expansion device 25c (25d) is opened to circulate the refrigerant. Similar to the load-side expansion device 25a (25b), the opening degree of the load-side expansion device 25c (25d) is controlled to achieve a constant degree of superheating determined by the difference between the temperature measured by the inlet temperature sensor 31c (31d) and the temperature measured by the outlet temperature sensor 32c (32d).

[Heating Only Operation Mode]

Figure 11:
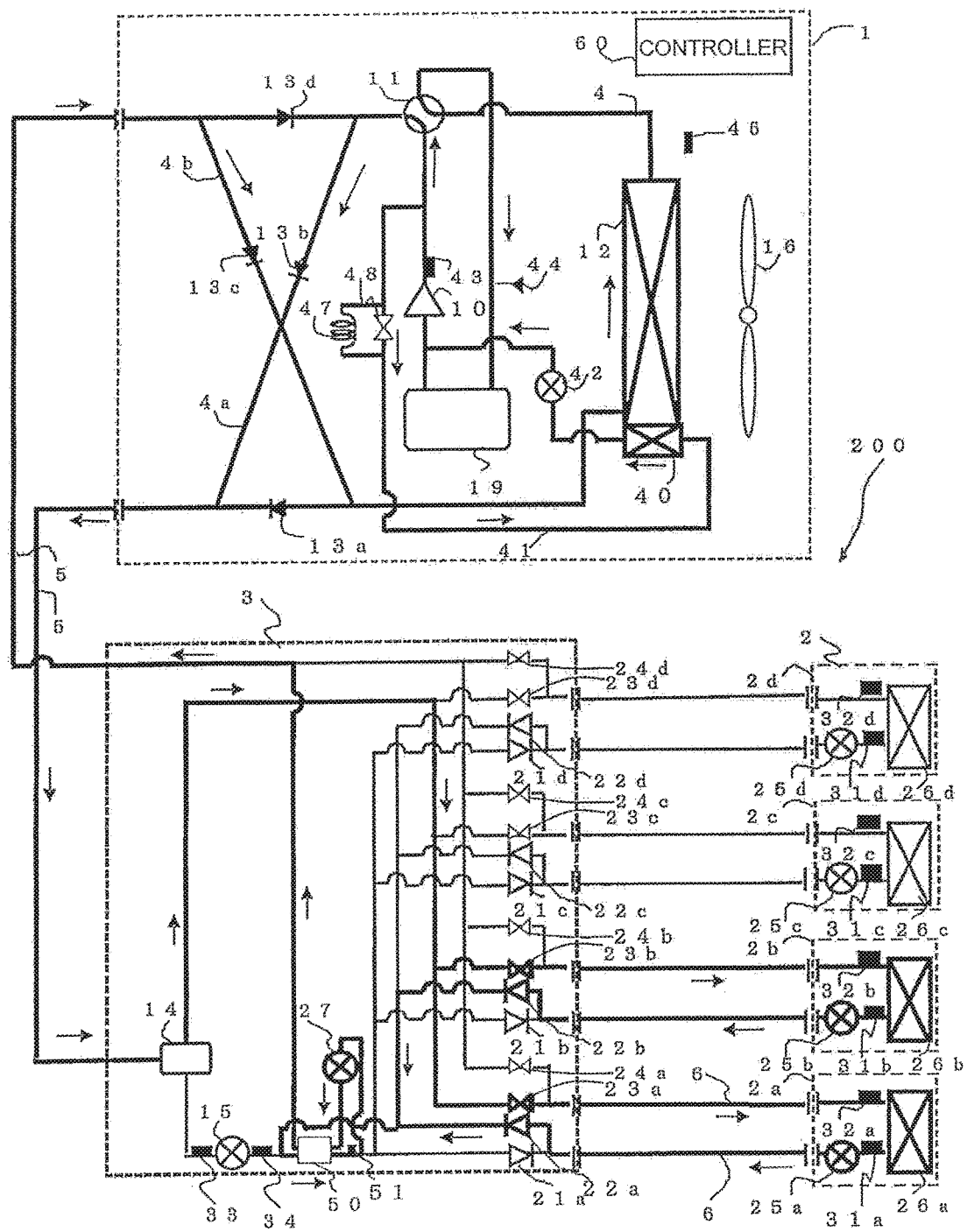
FIG. 11 is a refrigerant circuit diagram illustrating the flow of refrigerant in the air-conditioning apparatus 200 according to Embodiment 2 of the present invention in a heating only operation mode.

FIG. 11 is a refrigerant circuit diagram illustrating the flow of refrigerant in the air-conditioning apparatus 200 in a heating only operation mode. In FIG. 11, the solid lines indicate pipes through which the refrigerant circulates, and the solid arrows indicate the direction of the flowing refrigerant. A heating load is presumed to be generated only in the load-side heat exchangers 26a and 26b. In a heating only operation mode, the controller 60 switches the refrigerant flow-channel switcher 11 so that the heat-source-side refrigerant discharged from the compressor 10 flows into the relay unit 3 without passing through the heat-source-side heat exchanger 12.

The low-temperature low-pressure refrigerant is compressed at the compressor 10 and discharged in the form of high-temperature high-pressure gaseous refrigerant. The high-temperature high-pressure gaseous refrigerant discharged from the compressor 10 flows through the refrigerant flow-channel switcher 11 and the first backflow preventer 13b and flows out of the outdoor unit 1. The high-temperature high-pressure gaseous refrigerant flowing out of the outdoor unit 1 flows into the relay unit 3 via the main pipe 5.

The high-temperature high-pressure gaseous refrigerant flowing into the relay unit 3 passes through the gas-liquid separator 14, the first switching devices 23a and 23b, and the corresponding branching pipes 6, and flows into the load-side heat exchangers 26a and 26b acting as condensers. The refrigerant flowing into the load-side heat exchangers 26a and 26b transfers heat to the indoor air and turns into liquid refrigerant while heating the indoor air. The liquid refrigerant flowing out of the load-side heat exchangers 26a and 26b expands at the respective load-side expansion devices 25a and 25b and returns to the outdoor unit 1 via the corresponding branching pipes 6, the third backflow preventers 22a and 22b, the high-pressure-side flow channel of the refrigerant heat exchanger 50, the fifth expansion device 27 in an open state, the low-pressure-side flow channel of the refrigerant heat exchanger 50, and the main pipe 5. At this time, the opening degree of the load-side expansion device 25a is controlled to achieve a constant degree of subcooling determined by the difference between the saturation temperature converted from the pressure measured by the inlet pressure sensor 33 and the temperature measured by the inlet temperature sensor 31a. Similarly, the opening degree of the load-side expansion device 25b is controlled to achieve a constant degree of subcooling determined by the difference between the saturation temperature converted from the pressure measured by the inlet pressure sensor 33 and the temperature measured by the inlet temperature sensor 31b.

The refrigerant flowing into the outdoor unit 1 passes through the first backflow preventer 13c, receives heat from the outdoor air at the heat-source-side heat exchanger 12, turns into low-temperature low-pressure gaseous refrigerant, and returns to the compressor 10 via the refrigerant flow-channel switcher 11 and the accumulator 19.

The refrigerant needs not to be fed to the load-side heat exchangers 26c and 26d, which do not receive a heat load, and thus the respective load-side expansion devices 25c and 25d are closed. When a cooling load is applied to the load-side heat exchanger 26c (26d), the load-side expansion device 25c (25d) is opened to circulate the refrigerant. Similar to the load-side expansion device 25a (25b), the opening degree of the load-side expansion device 25c (25d) is controlled to achieve a constant degree of superheating determined by the difference between the temperature measured by the inlet temperature sensor 31c (31d) and the temperature measured by the outlet temperature sensor 32c (32d).

[Heating Main Operation Mode]

Figure 12:
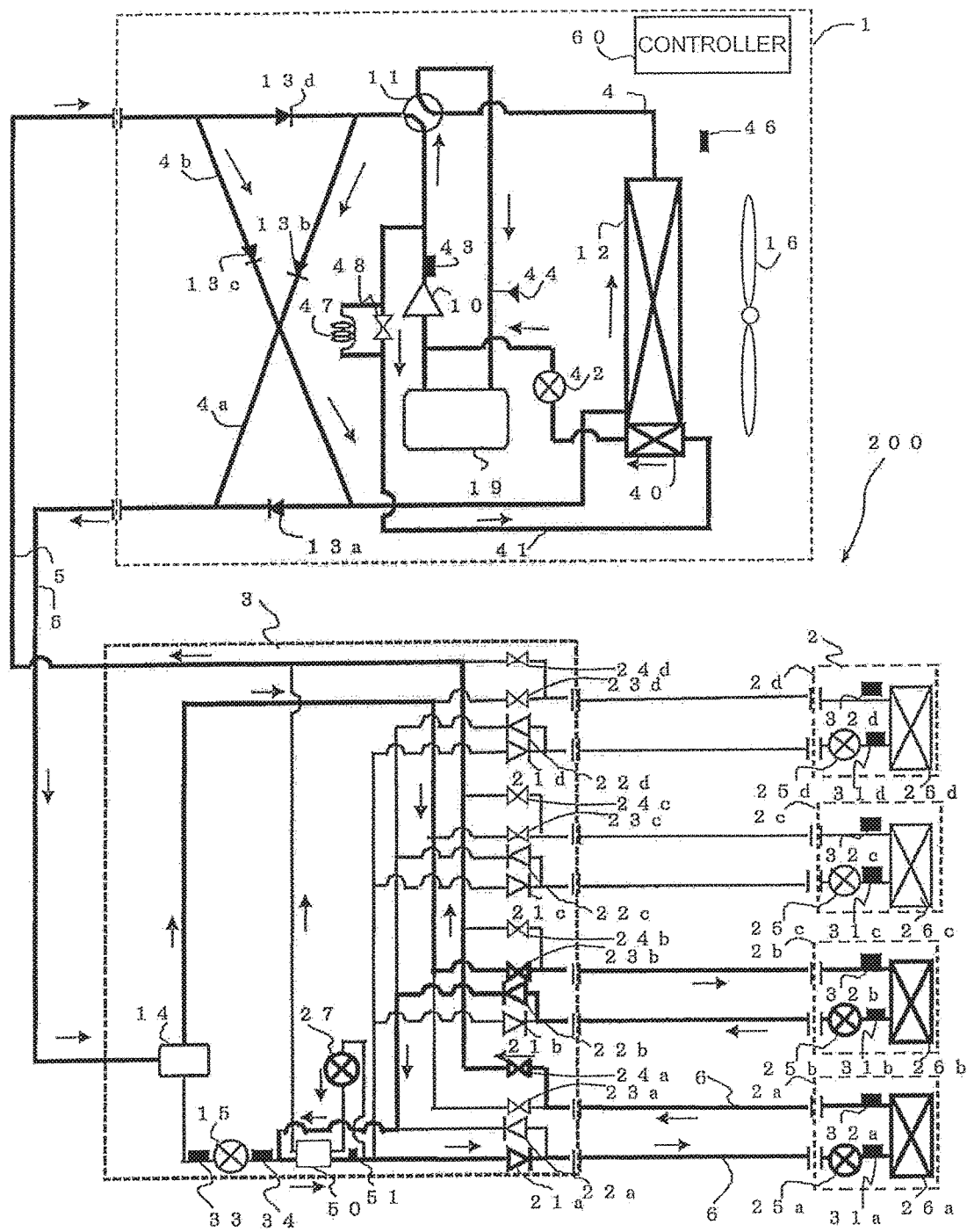
FIG. 12 is a refrigerant circuit diagram illustrating the flow of the refrigerant in the air-conditioning apparatus 200 according to Embodiment 2 of the present invention in a heating main operation mode.

FIG. 12 is a refrigerant circuit diagram illustrating the flow of the refrigerant in the air-conditioning apparatus 200 in a heating main operation mode. In FIG. 12, the solid lines indicate pipes through which the refrigerant circulates, and the solid arrows indicate the direction of the flowing refrigerant. A cooling load is presumed to be generated only in the load-side heat exchanger 26a, and a heating load is presumed to be generated only in the load-side heat exchanger 26b. In a heating main operation mode, the controller 60 switches the refrigerant flow-channel switcher 11 so that the heat-source-side refrigerant discharged from the compressor 10 flows into the relay unit 3 without passing through the heat-source-side heat exchanger 12.

The low-temperature low-pressure refrigerant is compressed by the compressor 10 and discharged in the form of high-temperature high-pressure gaseous refrigerant. The high-temperature high-pressure gaseous refrigerant discharged from the compressor 10 flows through the refrigerant flow-channel switcher 11 and the first backflow preventer 13b and flows out of the outdoor unit 1. The high-temperature high-pressure gaseous refrigerant flowing out of the outdoor unit 1 flows into the relay unit 3 via the main pipe 5.

The high-temperature high-pressure gaseous refrigerant flowing into the relay unit 3 flows into the load-side heat exchanger 26b acting as a condenser via the gas-liquid separator 14, the first switching device 23b, and the corresponding branching pipe 6. The refrigerant flowing into the load-side heat exchanger 26b transfers heat to the indoor air and turns into liquid refrigerant while heating the indoor air. The liquid refrigerant flowing out of the load-side heat exchanger 26b expands at the load-side expansion device 25b, flows through the corresponding branching pipe 6 and the third backflow preventer 22b, and is sufficiently subcooled at the refrigerant heat exchanger 50. A major portion of the subcooled refrigerant flows through the second backflow preventer 21a and the corresponding branching pipe 6 and expands into low-temperature low-pressure refrigerant in a two-phase gas-liquid state at the load-side expansion device 25a. The remaining portion of the liquid refrigerant expands into intermediate-temperature intermediate-pressure refrigerant in a liquid state or in a two-phase gas-liquid state at the fifth expansion device 27, which is also used as a bypass. The refrigerant in a liquid state or in a two-phase gas-liquid state exchanges heat with the liquid refrigerant at the refrigerant heat exchanger 50, turns into a low-temperature intermediate-pressure refrigerant in a gas state or in a two-phase gas-liquid state, and flows into the low-pressure pipe on the outlet side of the relay unit 3.

The refrigerant in a two-phase gas-liquid state expanding at the load-side expansion device 25a flows into the load-side heat exchanger 26a acting as an evaporator, receives heat from the indoor air, and turns into low-temperature intermediate-pressure refrigerant in a two-phase gas-liquid state while cooling the indoor air. The refrigerant in a two-phase gas-liquid state flowing out of the load-side heat exchanger 26a flows through the corresponding branching pipe 6 and the second switching device 24a and is combined with the remaining refrigerant flowing out of the refrigerant heat exchanger 50. The combined refrigerant flows out of the relay unit 3 and returns to the outdoor unit 1 via the main pipe 5. The refrigerant flowing into the outdoor unit 1 flows through the first backflow preventer 13c, receives heat from the outdoor air at the heat-source-side heat exchanger 12, and turns into low-temperature low-pressure gaseous refrigerant. The gaseous refrigerant returns to the compressor 10 via the refrigerant flow-channel switcher 11 and the accumulator 19.

At this time, the opening degree of the load-side expansion device 25b is controlled to achieve a constant degree of subcooling determined by the difference between the saturation temperature converted from the pressure measured by the inlet pressure sensor 33 and the temperature measured by the inlet temperature sensor 31b. The opening degree of the load-side expansion device 25a is controlled to achieve a constant degree of superheating determined by the difference between the temperature measured by the inlet temperature sensor 31a and the temperature measured by the outlet temperature sensor 32b.

The opening degree of the fifth expansion device 27 is controlled to achieve a constant degree of subcooling determined by the difference between the saturation temperature converted from the pressure measured by the outlet pressure sensor 34 and the temperature measured by the temperature sensor 51. For example, the opening degree of the fifth expansion device 27 is controlled so that the difference between the pressure measured by the inlet pressure sensor 33 and the pressure measured by the outlet pressure sensor 34 is a predetermined value (0.3 MPa, for example).

The refrigerant needs not to be fed to the load-side heat exchangers 26c and 26d, which do not receive a heat load, and thus the respective load-side expansion devices 25c and 25d are closed. When a heating load is applied to the load-side heat exchanger 26c (26d), the load-side expansion device 25c (25d) is opened to circulate the refrigerant.

Similar to the air-conditioning apparatus 100 illustrated in FIGS. 1 to 4, the air-conditioning apparatus 200 illustrated in FIGS. 8 to 12 injects refrigerant to the suction portion of the compressor 10 via the first expansion device 47, the third expansion device 48, the auxiliary heat exchanger 40, and the second expansion device 42 in cooling and heating operation modes. This configuration provides a reliable system even with an inexpensive compressor without a special structure. A reduction in excess rise in the discharge temperature of the compressor 10 can increase the rotation frequency of the compressor 10. Such a configuration can achieve high heating capacity and enhance comfort of the user.

In the air-conditioning apparatus 200, the dimensions of the first expansion device 47 and the third expansion device 48 and the variable range of the opening port area of the second expansion device 42 can be determined on the basis of the injection flow ratio Gr1/Gr2 as in Embodiment 1. The operation of the second expansion device 42 and the third expansion device 48 can be controlled as in Embodiment 1.

Embodiment 3

Figure 13:
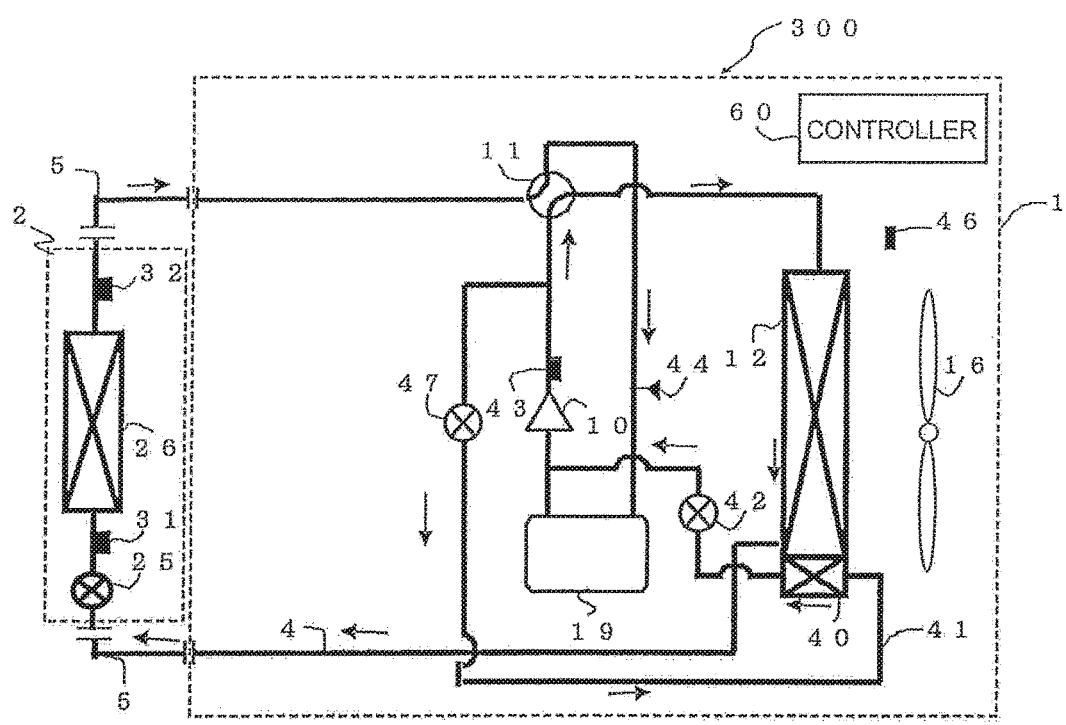
FIG. 13 is a schematic circuit diagram illustrating an example configuration of the circuit of an air-conditioning apparatus 300 according to Embodiment 3 of the present invention and the flow of refrigerant in a cooling only operation mode.

An air-conditioning apparatus according to Embodiment 3 of the present invention will be described below. FIG. 13 is a schematic circuit diagram illustrating an example configuration of the circuit of an air-conditioning apparatus 300 according to this embodiment and the flow of refrigerant in a cooling only operation mode. Components that have the same functions and operations as those according to Embodiment 1 are indicated by the same reference signs, and descriptions of the components are omitted. The air-conditioning apparatus 300 according to this embodiment differs from that of the air-conditioning apparatus 100 according to Embodiment 1 in the configuration of the outdoor unit 1.

Unlike the outdoor unit 1 of the air-conditioning apparatus 100, the outdoor unit 1 of the air-conditioning apparatus 300 does not include a third expansion device 48 but includes a first expansion device 47 having a variable opening degree (for example, an electronic expansion valve). The injection control in this embodiment, which is similar to that in Embodiment 1, can provide a reliable system even with an inexpensive compressor without a special structure. A reduction in excess rise in the discharge temperature of the compressor 10 can increase the rotation frequency of the compressor 10. Such a configuration can achieve high heating capacity and enhance comfort of the user. According to this embodiment, the variably controlled opening degree of the first expansion device 47 enables finer control of the injection rate compared to that according to Embodiment 1.

Embodiment 4

Figure 14:
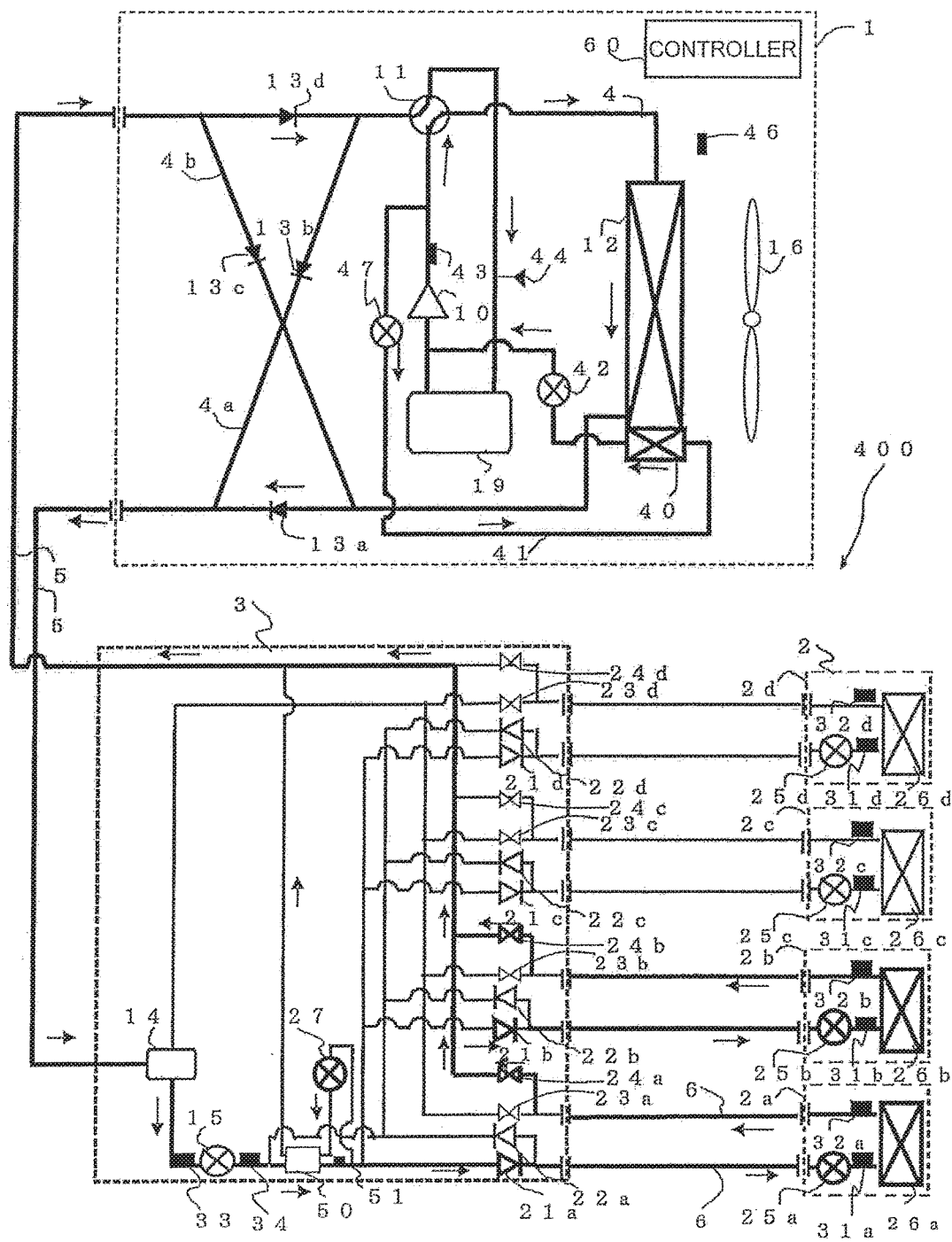
FIG. 14 is a schematic circuit diagram illustrating an example configuration of the circuit of an air-conditioning apparatus 400 according to Embodiment 4 of the present invention and the flow of refrigerant in a cooling only operation mode.

An air-conditioning apparatus according to Embodiment 4 of the present invention will be described below. FIG. 14 is a schematic circuit diagram illustrating an example configuration of the circuit of an air-conditioning apparatus 400 according to this embodiment and the flow of refrigerant in a cooling only operation mode. Components that have the same functions and operations as those according to Embodiments 1 and 2 are indicated by the same reference signs, and descriptions of the components are omitted. The air-conditioning apparatus 400 according to this embodiment differs from the air-conditioning apparatus 200 according to Embodiment 2 in the configuration of the outdoor unit 1.

Unlike the outdoor unit 1 of the air-conditioning apparatus 200, the outdoor unit 1 of the air-conditioning apparatus 400 does not include a third expansion device 48 but includes a first expansion device 47 having a variable opening degree (for example, an electronic expansion valve). The injection control according to this embodiment, which is similar to those according to Embodiments 1 and 2, can provide a reliable system even with an inexpensive compressor without a special structure. A reduction in excess rise in the discharge temperature of the compressor 10 can increase the rotation frequency of the compressor 10. Such a configuration can achieve high heating capacity and enhance comfort of the user. According to this embodiment, the variably controlled opening degree of the first expansion device 47 enables finer control of the injection rate compared to those according to Embodiments 1 and 2.

Embodiment 5

Figure 15:
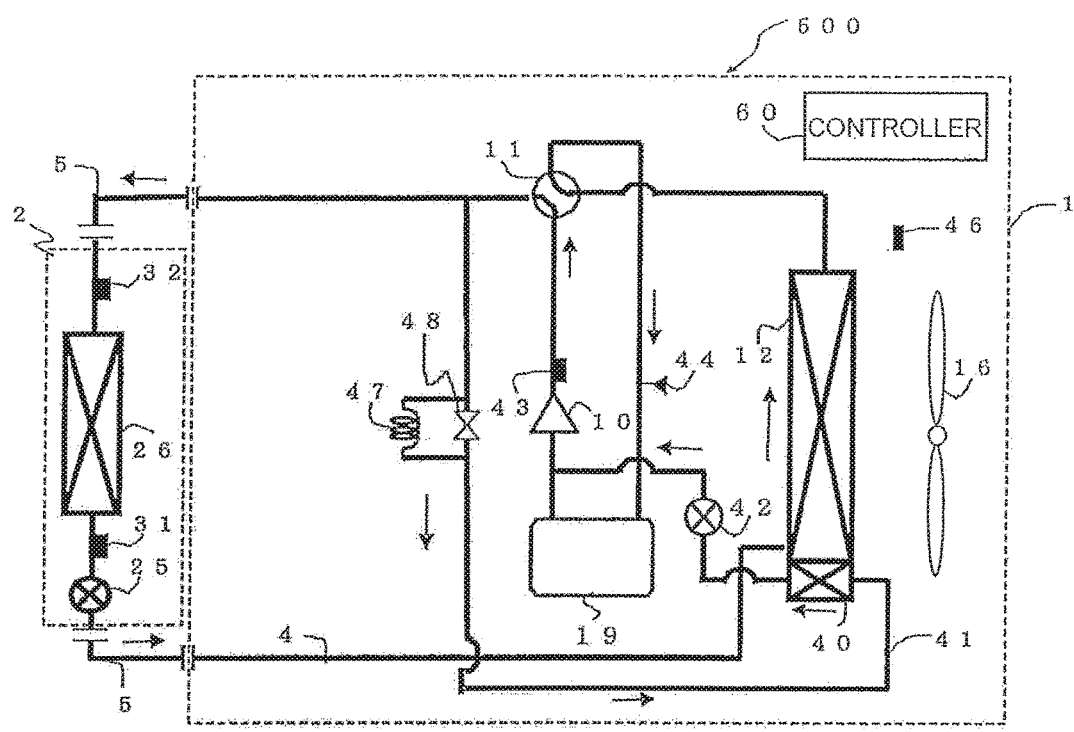
FIG. 15 is a schematic circuit diagram illustrating an example configuration of the circuit of an air-conditioning apparatus 500 according to Embodiment 5 of the present invention and the flow of refrigerant in a heating only operation mode.

An air-conditioning apparatus according to Embodiment 5 of the present invention will be described below. FIG. 15 is a schematic circuit diagram illustrating an example configuration of the circuit of an air-conditioning apparatus 500 according to this embodiment and the flow of refrigerant in a heating only operation mode. Components that have the same functions and operations as those according to Embodiment 1 are indicated by the same reference signs, and descriptions of the components are omitted. The air-conditioning apparatus 500 according to this embodiment differs from the air-conditioning apparatus 100 according to Embodiment 1 in the configuration of the outdoor unit 1.

In the air-conditioning apparatus 500, one end of the bypass pipe 41 (bypass) is connected to a portion between the refrigerant flow-channel switcher 11 and the load-side heat exchanger 26 in the refrigeration cycle of outdoor unit 1. This configuration enables high-pressure refrigerant to be introduced to the bypass pipe 41 only during a heating operation. Thus, the air-conditioning apparatus 500 is capable of injection only during a heating operation. The configuration according to this embodiment may be employed when injection is not required during a cooling operation but required only during a heating operation. The injection control during a heating operation is similar to that according to Embodiment 1.

According to this embodiment, injection can be controlled similarly to that according to Embodiment 1 and achieve finer control of the injection rate. Thus, a reliable system can be provided even with an inexpensive compressor without a special structure. A reduction in excess rise in the discharge temperature of the compressor 10 can increase the rotation frequency of the compressor 10. Such a configuration can achieve high heating capacity and enhance comfort of the user.

Embodiment 6

Figure 16:
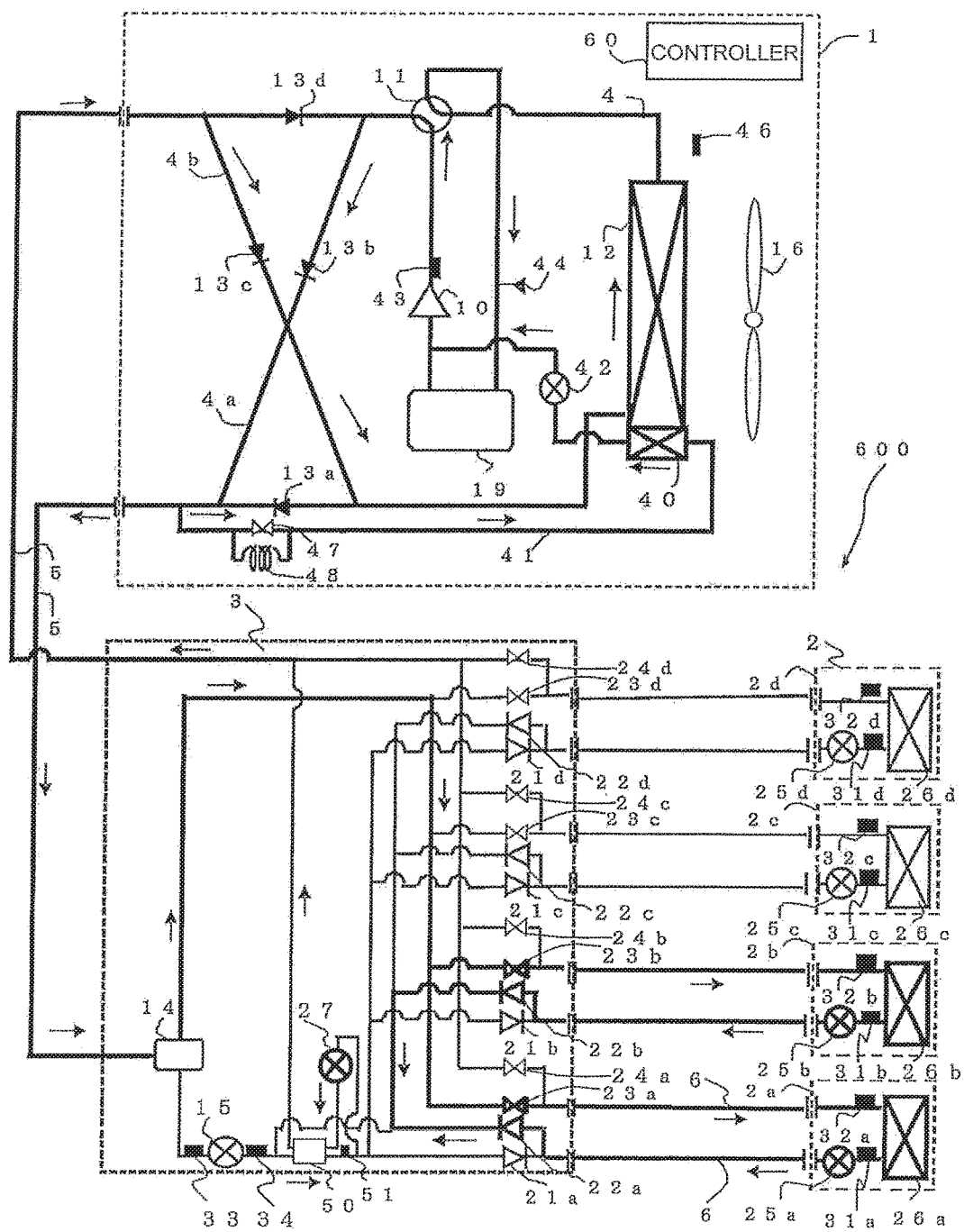
FIG. 16 is a schematic circuit diagram illustrating an example configuration of the circuit of an air-conditioning apparatus 600 according to Embodiment 6 of the present invention and the flow of refrigerant in a heating only operation mode.

An air-conditioning apparatus according to Embodiment 6 of the present invention will be described below. FIG. 16 is a schematic circuit diagram illustrating an example configuration of the circuit of an air-conditioning apparatus 600 according to this embodiment and the flow of refrigerant in a heating only operation mode. Components that have the same functions and operations as those according to Embodiment 1 or 2 are indicated by the same reference signs, and descriptions of the components are omitted. The air-conditioning apparatus 600 according to this embodiment differs from the air-conditioning apparatus 200 according to Embodiment 2 in the configuration of the outdoor unit 1.

In the air-conditioning apparatus 600, one end of the bypass pipe 41 (bypass) is connected to a portion between the refrigerant flow-channel switcher 11 and the inlet-side flow channel of the relay unit 3 (the gas-liquid separator 14, for example) in the refrigeration cycle of the outdoor unit 1. This configuration enables high-pressure refrigerant to be introduced to the bypass pipe 41 only during a heating operation. Thus, the air-conditioning apparatus 600 is capable of injection only during a heating operation. The configuration according to this embodiment may be employed when injection is not required during a cooling operation but required only during a heating operation. The injection control during a heating operation is similar to those according to Embodiments 1 and 2.

According to this embodiment, injection can be controlled similarly to those according to Embodiments 1 and 2 and achieve finer control of the injection rate. Thus, a reliable system can be provided even with an inexpensive compressor without a special structure. A reduction in excess rise in the discharge temperature of the compressor 10 can increase the rotation frequency of the compressor 10. Such a configuration can achieve high heating capacity and enhance comfort of the user.

Other Embodiments

The present invention may include various modifications other than the embodiments described above.

For example, in the embodiments described above, the cooling and heating operation modes have a discharge temperature threshold (first value) of 110 degrees C. Alternatively, the discharge temperature threshold may be any value determined depending on the limit of the discharge temperature of the compressor 10. For example, when the limit of the discharge temperature of the compressor 10 is 120 degrees C., the controller 60 controls the operation of the compressor 10 so that the discharge temperature does not exceed 120 degrees C. In detail, the controller 60 decelerates the compressor 10 through lowering of frequency in response to a discharge temperature exceeding 110 degrees C. Thus, the discharge temperature of the compressor 10 is preferred to be lowered by injection to a preliminarily determined target discharge temperature (third value) within the range of 90 degrees C. to 105 degrees C. (for example, 100 degrees C.), which is slightly lower than 110 degrees C., which corresponds to the discharge temperature threshold at which the frequency of the compressor 10 is lowered. For example, when the frequency of the compressor 10 is not to be lowered in response to a discharge temperature exceeding 110 degrees C., the discharge temperature threshold should be within the range of 90 degrees C. to 120 degrees C. (110 degrees C., for example).

In the embodiments described above, refrigerant R32 is used. Alternatively, any other refrigerant may be used. An example of such refrigerant may include a refrigerant mixture (zeotropic refrigerant mixture) of R32 refrigerant and tetrafluoropropene refrigerant, such as HFO1234yf and HFO1234ze, having a low global warming potential and represented by the formula $CF_3CF=CH_2$. In particular, the discharge temperature is approximately 20 degrees C. higher for R32 refrigerant than that for R410A refrigerant under the same operating conditions. Thus, the discharge temperature increased by the R32 refrigerant can be efficiently lowered through the injection described above. Such an advantageous effect is particularly high during use of refrigerants that cause an increase in discharge temperature.

A refrigerant mixture of R32 refrigerant and HFO1234yf having an R32 mass percentage of 62% (62 wt %) or higher increases the discharge temperature by 3 degrees C. or more compared to R410A refrigerant. Thus, the advantageous effect is high in decreasing the discharge temperature by the injection described above. A refrigerant mixture of R32 refrigerant and HFO1234ze having an R32 mass percentage of 43% (43 wt %) or higher increases the discharge temperature by 3 degrees C. or more compared to R410A refrigerant. Thus, the advantageous effect is high in decreasing the discharge temperature by the injection described above. The types of refrigerant in a refrigerant mixture should not be limited to those mentioned above. A refrigerant mixture containing a small volume of other refrigerant components has a minor effect on discharge temperature and thus achieves the same advantageous effects as described above. For example, a refrigerant mixture containing R32 refrigerant, HFO1234yf, and a small volume of another refrigerant achieves the same advantageous effects as described above.

The refrigerant used in the embodiments described above may be any type of refrigerant that operates in a supercritical state on the high-pressure side, such as $CO_2$ (R744). In this case also, the discharge temperature can be lowered to a required level through the refrigerant circuit according to the embodiments described above.

In the embodiments described above, the auxiliary heat exchanger 40 is integrated with the heat-source-side heat exchanger 12. Alternatively, the auxiliary heat exchanger 40 may be provided independently from the heat-source-side heat exchanger 12. In the embodiments described above, the auxiliary heat exchanger 40 is disposed below the heat-source-side heat exchanger 12. Alternatively, the auxiliary heat exchanger 40 may be disposed above the heat-source-side heat exchanger 12. The auxiliary heat exchanger 40 is disposed below the heat transfer fins, and the heat-source-side heat exchanger 12 is disposed above the heat transfer fins. Alternatively, the auxiliary heat exchanger 40 may be disposed above the heat transfer fins, and the heat-source-side heat exchanger 12 may be disposed below the heat transfer fins.

In the air-conditioning apparatuses according to Embodiments 2, 4 and 6 that can simultaneously perform heating and cooling operations, two main pipes 5 connect the outdoor unit 1 and the relay unit 3. Alternatively, any other known configuration may be used for the connection. For example, an air-conditioning apparatus that includes an outdoor unit 1 and a relay unit 3 connected with three main pipes 5 and simultaneously performs heating and cooling operations can reduce an excess rise in the temperature of high-temperature high-pressure gaseous refrigerant discharged from the compressor 10, as in Embodiment 2 described above.

In the embodiments described above, the compressor 10 has a low-pressure shell structure. Alternatively, the compressor may have a high-pressure shell structure. A compressor having a high-pressure shell structure can achieve the same advantageous effects described above.

In the embodiments described above, the compressor 10 does not have a structure for feeding refrigerant to the intermediate-pressure portion. Alternatively, the compressor may include an injection port for feeding refrigerant to the intermediate-pressure portion.

Typically, the heat-source-side heat exchanger 12 and the load-side heat exchangers 26a to 26d are equipped with fans that facilitate condensation or evaporation of the refrigerant by flowing air. Alternatively, other components may be provided. For example, the load-side heat exchangers 26a to 26d may be panel heaters that radiate heat. The heat-source-side heat exchanger 12 may be of a water-cooled type that exchanges heat with liquid, such as water and antifreeze. Any heat exchanger may be used that can transfer or receive heat to or from the refrigerant. For example, the auxiliary heat exchanger 40 may be a water-cooled refrigerant heat exchanger, such as a plate heat exchanger and a double-pipe heat exchanger, or may be a heat exchanger equipped with a fan for cooling the controller 60.

In the embodiments described above, the "load side" of the load-side expansion devices 25 refers to a position closer to the load side than the first expansion device 47, the second expansion device 42, and the third expansion device 48. That is, in the present invention, the load-side expansion devices 25 may be disposed inside the outdoor unit 1 or the relay unit 3.

The air-conditioning apparatus according to the embodiments described above dedicated to cooling or heating may not include the refrigerant flow-channel switcher 11.

Figure 17:
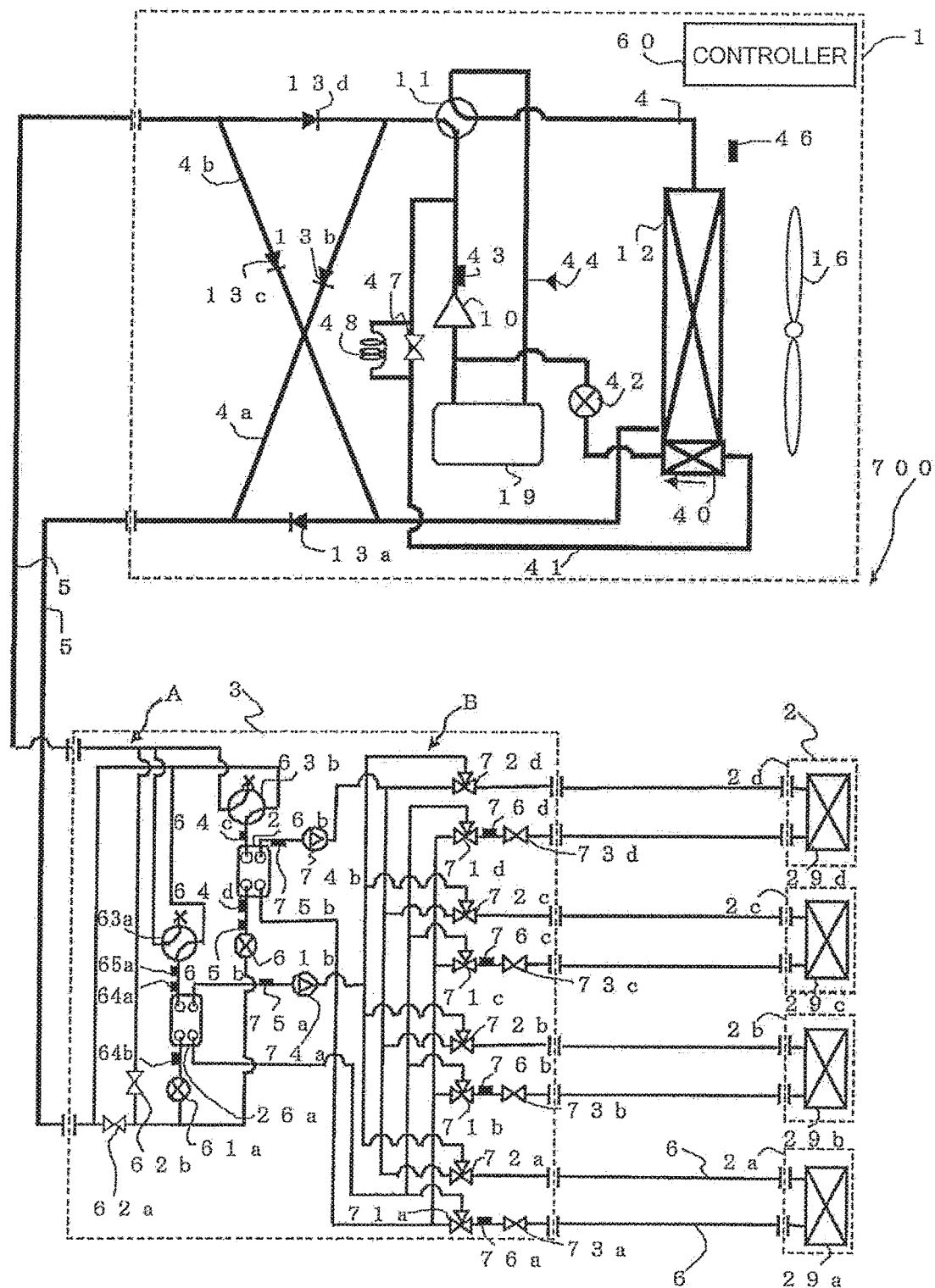
FIG. 17 is a schematic circuit diagram illustrating an example configuration of the circuit of an air-conditioning apparatus 700 according to a modification of an embodiment of the present invention.

The embodiments describe a direct-expansion air-conditioning apparatus that circulates refrigerant through pipes connecting the outdoor unit 1 and the indoor units 2, or the outdoor unit 1, the relay unit 3 and the indoor units 2. Alternatively, the air-conditioning apparatus is not limited to these configurations. FIG. 17 is a schematic circuit diagram illustrating an example configuration of the circuit of an air-conditioning apparatus 700 according to a modification of an embodiment of the present invention. With reference to FIG. 17, the air-conditioning apparatus 700 includes load-side heat exchangers 26a and 26b that exchange heat between refrigerant in a plate heat exchanger and a heat medium, such as water and brine, inside the relay unit 3 connecting the outdoor unit 1 and the indoor units 2. The indoor units 2a to 2d of the air-conditioning apparatus 700 respectively accommodate heat exchangers 29a to 29d that exchange heat between a heat medium and air. The air-conditioning apparatus 700 circulates refrigerant through a portion A between the outdoor unit 1 and the relay unit 3 (the load-side heat exchangers 26a and 26b) and a heat medium through a portion B between the relay unit 3 and the indoor units 2 (heat exchangers 29a to 29d). In addition to the two load-side heat exchangers 26a and 26b, the refrigerant circuit side (heat source side) of the relay unit 3 is provided with two expansion devices 61a and 61b (electronic expansion valves, for example), two switching devices 62a and 62b (two-way valves, for example), two refrigerant flow-channel switchers 63a and 63b (four-way valves, for example), four temperature sensors 64a to 64d, and two pressure sensors 65a and 65b. The heat medium side (load side) of the relay unit 3 is provided with heat-medium flow-channel switchers 71a to 71d (three-way valves, for example) corresponding to the number of indoor units 2 (four in this embodiment), heat-medium flow-channel switchers 72a to 72d (three-way valves, for example) corresponding to the number of indoor units 2 (four in this embodiment), heat-medium flow control devices 73a to 73d (two-way valves having variably controllable opening degrees, for example) corresponding to the number of indoor units 2 (four in this embodiment), two pumps 74a and 74b, two temperature sensors 75a and 75b, and temperature sensors 76a to 76d corresponding to the number of indoor units 2 (four in this embodiment). The present invention can also be applied to the air-conditioning apparatus 700 illustrated in FIG. 17.

The air-conditioning apparatuses according to the embodiments described above each include a refrigeration cycle that circulates refrigerant and connects a compressor 10, a heat-source-side heat exchanger 12, one or more of load-side expansion devices 25, 25a to 25d, and one or more of load-side heat exchangers 26, 26a to 26d by refrigerant pipes, a bypass (bypass pipe 41, for example) having one end connected to a discharge side of the compressor 10 of the refrigeration cycle and the other end connected to a suction side of the compressor 10 of the refrigeration cycle to bypass a portion of the refrigerant discharged from the compressor 10, a first expansion device 47 disposed in the bypass and depressurizing the refrigerant flowing through the bypass, an auxiliary heat exchanger 40 disposed downstream of the first expansion device 47 of the bypass and cooling the refrigerant depressurized at the first expansion device 47, a second expansion device 42 disposed downstream of the auxiliary heat exchanger 40 of the bypass and controlling the flow rate of the refrigerant flowing from the auxiliary heat exchanger 40 to the suction side of the compressor 10, and a controller 60 controlling the opening degree of the second expansion device 42.

In each air-conditioning apparatus according to the embodiments described above, the controller 60 may control the opening degree of the second expansion device 42 so that the discharge temperature of the refrigerant discharged from the compressor 10 is lower than a discharge temperature threshold (first value) when the discharge temperature of the refrigerant discharged from the compressor 10 reaches the discharge temperature threshold.

In each air-conditioning apparatus according to the embodiments described above, the upper limit of the discharge temperature threshold may be 110 degrees C.

In each air-conditioning apparatus according to the embodiments described above, the controller 60 may control the opening degree of the second expansion device 42 so that the discharge temperature of the refrigerant discharged from the compressor 10 approximates a target discharge temperature (third value).

In each air-conditioning apparatus according to the embodiments described above, the target discharge temperature may be 90 degrees C. or higher and 105 degrees C. or lower.

In each air-conditioning apparatus according to the embodiments described above, the first expansion device 47 may have a variable opening degree, and the controller 60 may control the opening degree of the first expansion device 47 on the basis of the refrigerant circulation volume Gr2 of the refrigerant discharged from the compressor 10.

In each air-conditioning apparatus according to the embodiments described above, the first expansion device 47 may be a fixed expansion device, the third expansion device 48 at least capable of being opened and closed is disposed in parallel with the first expansion device 47 in the bypass, and the controller 60 may open or close the third expansion device 48 on the basis of the refrigerant circulation volume Gr2 of the refrigerant discharged from the compressor 10.

In each air-conditioning apparatus according to the embodiments described above, the controller 60 may calculate the density of saturated gas on the basis of the pressure of the refrigerant at the suction side of the compressor 10, the refrigerant circulation volume Gr2 on the basis of the density of saturated gas and the frequency of the compressor 10, and the maximum refrigerant circulation volume Grmax on the basis of the density of saturated gas and the maximum operable frequency of the compressor 10, and the controller 60 may open the third expansion device 48 when the maximum refrigerant circulation volume ratio Gr2/Grmax determined by dividing the refrigerant circulation volume Gr2 by the maximum refrigerant circulation volume Grmax is a predetermined value (second value) or more.

Each air-conditioning apparatus according to the embodiments described above may further include an outdoor unit 1 including the compressor 10 and the heat-source-side heat exchanger 12, indoor units 2a to 2d including the respective load-side expansion devices 25a to 25d and the respective load-side heat exchangers 26a to 26d, and a relay unit 3 connecting the outdoor unit 1 and the indoor units 2a to 2d, and the outdoor unit 1 and the indoor units 2a to 2d are connected via the relay unit 3 so that refrigerant circulates the outdoor unit 1 and the indoor units 2a to 2d through the relay unit 3.

In each air-conditioning apparatus according to the embodiments described above, the refrigeration cycle may include a refrigerant flow-channel switcher 11 that switches a flow channel of the refrigerant between a cooling operation and a heating operation, one end of the bypass may be connected to a portion between the refrigerant flow-channel switcher 11 and the load-side heat exchangers 26a to 26d of the refrigeration cycle, and the controller 60 may control the opening degree of the second expansion device 42 during the heating operation.

In each air-conditioning apparatus according to the embodiments described above, the refrigeration cycle may include a refrigerant flow-channel switcher 11 that switches a flow channel of the refrigerant between a cooling operation and a heating operation, one end of the bypass may be connected to a portion between the refrigerant flow-channel switcher 11 and the inlet-side flow channel of the relay unit 3 in the refrigeration cycle, the controller 60 may control the opening degree of the second expansion device 42 during the heating operation, and the heating operation may include a heating only operation mode involving all of the load-side heat exchangers 26a to 26d not at standstill acting as condensers and a heating main operation mode involving some of the load-side heat exchangers 26a to 26d acting as condensers and the other load-side heat exchangers 26a to 26d acting as evaporators.

In each air-conditioning apparatus according to the embodiments described above, at least one of the heat-source-side heat exchanger 12 and the auxiliary heat exchanger 40 may be a water-refrigerant heat exchanger that exchanges heat between water and refrigerant.

The embodiments and modifications described above may be combined with each other.

REFERENCE SIGNS LIST 1 outdoor unit 2, 2a, 2b, 2c, 2d indoor unit 3 relay unit 4 refrigerant pipe 4a first connection pipe 4b second connection pipe 5 main pipe 6 branching pipe 10 compressor 11 refrigerant flow-channel switcher 12 heat-source-side heat exchanger 13a, 13b, 13c, 13d first backflow preventer 14 gas-liquid separator 15 fourth expansion device 16 heat-source-side fan 19 accumulator 21a, 21b, 21c, 21d second backflow preventer 22a, 22b, 22c, 22d third backflow preventer 23a, 23b, 23c, 23d first switching device 24a, 24b, 24c, 24d second switching device 25, 25a, 25b, 25c, 25d load-side expansion device 26, 26a, 26b, 26c, 26d load-side heat exchanger 27 fifth expansion device 29a, 29b, 29c, 29d heat exchanger 31, 31a 31b, 31c, 31d inlet temperature sensor 32, 32a, 32b, 32c, 32d outlet temperature sensor 33 inlet pressure sensor 34 outlet pressure sensor 40 auxiliary heat exchanger 41 bypass pipe 42 second expansion device 43 discharge temperature sensor 44 pressure sensor 46 outdoor temperature sensor 47 first expansion device 48 third expansion device 50 refrigerant heat exchanger 51 temperature sensor 60 controller 61a, 61b expansion device 62a, 62b switching device 63a, 63b refrigerant flow-channel switcher 64a, 64b, 64c, 64d temperature sensor 65a, 65b pressure sensor 71a, 71b, 71c, 71d, 72a, 72b, 72c, 72d heat-medium flow-channel switcher 73a, 73b, 73c, 73d heat-medium flow control device 74a, 74b pump 75a, 75b, 76a, 76b, 76c, 76d temperature sensor 100, 200, 300, 400, 500, 600, 700 air-conditioning apparatus

The invention claimed is:

1. An air-conditioning apparatus comprising:
a refrigeration cycle circulating refrigerant and connecting a compressor, a heat-source-side heat exchanger, one or more of load-side expansion valves, and one or more of load-side heat exchangers by refrigerant pipes;
a bypass having one end connected to a discharge side of the compressor of the refrigeration cycle and another end connected to a suction side of the compressor of the refrigeration cycle to bypass a portion of the refrigerant discharged from the compressor;
a first expansion device disposed in the bypass and comprising a member selected from the group consisting of a variable expansion valve and a fixed expansion device including a pipe or capillary tube, the first expansion device being configured to depressurize the refrigerant flowing through the bypass;
an auxiliary heat exchanger disposed downstream of the first expansion device of the bypass and cooling the refrigerant which flows into the auxiliary heat exchanger, the auxiliary heat exchanger being configured to send out all the cooled refrigerant to the suction side of the compressor;
a second expansion device comprising an expansion valve disposed downstream of the auxiliary heat exchanger of the bypass and configured to control a flow rate of the refrigerant flowing from the auxiliary heat exchanger to the suction side of the compressor;
a third expansion device comprising an expansion valve at least configured to be opened and closed is disposed in parallel with the first expansion device in the bypass, and
a controller configured to
control an opening degree of the second expansion device,
open or close the third expansion device on a basis of a refrigerant circulation volume of the refrigerant discharged from the compressor,
calculate a density of saturated gas on a basis of a pressure of the refrigerant at the suction side of the compressor,
calculate the refrigerant circulation volume on a basis of the density of saturated gas and a frequency of the compressor, calculate a maximum refrigerant circulation volume on a basis of the density of saturated gas and a maximum operable frequency of the compressor, and open the third expansion device when a maximum refrigerant circulation volume ratio determined by dividing the refrigerant circulation volume by the maximum refrigerant circulation volume is a predetermined value or more.

2. The air-conditioning apparatus of claim 1, wherein the controller is configured to control the opening degree of the second expansion device so that a discharge temperature of the refrigerant discharged from the compressor is lower than a discharge temperature threshold when the discharge temperature of the refrigerant discharged from the compressor reaches the discharge temperature threshold.

3. The air-conditioning apparatus of claim 2, wherein an upper limit of the discharge temperature threshold is 110 degrees C.

4. The air-conditioning apparatus of claim 1, wherein,
the first expansion device has a variable opening degree, and
the controller is configured to control an opening degree of the first expansion device on a basis of a refrigerant circulation volume of the refrigerant discharged from the compressor.

5. The air-conditioning apparatus of claim 1, further comprising:
an outdoor unit including the compressor and the heat-source-side heat exchanger;
a plurality of indoor units each including the one of the load-side expansion valves and the one of the load-side heat exchangers; and
a relay unit connecting the outdoor unit and the plurality of indoor units,
wherein the outdoor unit and the plurality of indoor units are connected via the relay unit so that the refrigerant circulates in the outdoor unit and the plurality of indoor units through the relay unit.

6. The air-conditioning apparatus of claim 5, wherein,
the refrigeration cycle includes a refrigerant flow-channel switcher configured to switch a flow channel of the refrigerant between a cooling operation and a heating operation,
the one end of the bypass is connected to a portion between the refrigerant flow-channel switcher and an inlet-side flow channel of the relay unit in the refrigeration cycle,
the controller is configured to control the opening degree of the second expansion device during the heating operation, and
the heating operation includes a heating only operation mode involving all the load-side heat exchangers not at standstill acting as condensers and a heating main operation mode involving some of the load-side heat exchangers acting as condensers and the other load-side heat exchangers acting as evaporators.

7. The air-conditioning apparatus of claim 1, wherein,
the refrigeration cycle includes a refrigerant flow-channel switcher configured to switch a flow channel of the refrigerant between a cooling operation and a heating operation,
the one end of the bypass is connected to a portion between the refrigerant flow-channel switcher and the load-side heat exchangers of the refrigeration cycle, and
the controller is configured to control the opening degree of the second expansion device during the heating operation.

8. An air-conditioning apparatus comprising:
a refrigeration cycle circulating refrigerant and connecting a compressor, a heat-source-side heat exchanger, one or more of load-side expansion valves, and one or more of load-side heat exchangers by refrigerant pipes;
a bypass having one end connected to a discharge side of the compressor of the refrigeration cycle and another end connected to a suction side of the compressor of the refrigeration cycle to bypass a portion of the refrigerant discharged from the compressor, the one end to the other end of the bypass being independent from the refrigeration cycle;
a first expansion device comprising a fixed expansion device and disposed in the bypass, the first expansion device being configured to depressurize the refrigerant flowing through the bypass;
an auxiliary heat exchanger disposed downstream of the first expansion device of the bypass and cooling the refrigerant depressurized at the first expansion device;
a second expansion device comprising an expansion valve disposed downstream of the auxiliary heat exchanger of the bypass and configured to control a flow rate of the refrigerant flowing from the auxiliary heat exchanger to the suction side of the compressor;
a third expansion device comprising an expansion valve at least configured to be opened and closed is disposed in parallel with the first expansion device in the bypass and
a controller configured to
control an opening degree of the second expansion device,
open or close the third expansion device on a basis of a refrigerant circulation volume of the refrigerant discharged from the compressor,
calculate a density of saturated gas on a basis of a pressure of the refrigerant at the suction side of the compressor,
calculate the refrigerant circulation volume on a basis of the density of saturated gas and a frequency of the compressor,
calculate a maximum refrigerant circulation volume on a basis of the density of saturated gas and a maximum operable frequency of the compressor, and
open the third expansion device when a maximum refrigerant circulation volume ratio determined by dividing the refrigerant circulation volume by the maximum refrigerant circulation volume is a predetermined value or more.

9. The air-conditioning apparatus of claim 1, wherein the controller is configured to control the opening degree of the second expansion device so that a discharge temperature of the refrigerant discharged from the compressor approximates a target discharge temperature.

10. The air-conditioning apparatus of claim 9, wherein the target discharge temperature is 90 degrees C. or higher and 105 degrees C. or lower.

* * * * *